(12) United States Patent
Kondo et al.

(10) Patent No.: US 9,122,923 B2
(45) Date of Patent: Sep. 1, 2015

(54) IMAGE GENERATION APPARATUS AND CONTROL METHOD

(71) Applicant: CANON KABUSHIKI KAISHA, Tokyo (JP)

(72) Inventors: Daiki Kondo, Hakodate (JP); Toru Kikuchi, Hino (JP); Masato Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 13/781,471

(22) Filed: Feb. 28, 2013

(65) Prior Publication Data

US 2013/0230251 A1   Sep. 5, 2013

(30) Foreign Application Priority Data

Mar. 5, 2012  (JP) .................................. 2012-047947

(51) Int. Cl.
G06K 9/46      (2006.01)
G06K 9/00      (2006.01)
G06T 11/00     (2006.01)

(52) U.S. Cl.
CPC ............ *G06K 9/00523* (2013.01); *G06T 11/00* (2013.01)

(58) Field of Classification Search
CPC ........... H04N 1/00; G06F 17/30; G06F 17/24; G06F 17/21; G11B 27/34

USPC ......................................................... 382/190
See application file for complete search history.

(56) References Cited

U.S. PATENT DOCUMENTS

| 6,954,894 | B1 * | 10/2005 | Balnaves et al. .............. 715/202 |
| 8,457,387 | B2 * | 6/2013 | Presetenback et al. ....... 382/154 |
| 8,847,951 | B1 * | 9/2014 | Anguelov et al. ............. 345/419 |
| 2009/0052734 | A1 * | 2/2009 | Hosaka et al. ................. 382/100 |
| 2011/0242123 | A1 * | 10/2011 | Momosaki et al. ........... 345/581 |

FOREIGN PATENT DOCUMENTS

| JP | 4343027 B2 | 10/2009 |
| JP | 4424389 B2 | 3/2010 |
| JP | 2011-30159 A | 2/2011 |

* cited by examiner

*Primary Examiner* — Stephen R Koziol
*Assistant Examiner* — Totam Le
(74) *Attorney, Agent, or Firm* — Canon USA Inc IP Division

(57) ABSTRACT

An image generation apparatus stores a plurality of selection condition rows including a plurality of selection conditions used for selecting an image from a plurality of material images, selects at least one material image from the plurality of material images as a first material image, obtains a feature quantity of the first material image, selects a selection condition row which is stored in the storage unit and includes a selection condition including the obtained feature quantity, selects a second material image from the plurality of material images based on a selection condition row which has been selected, and generates an image based on the first and the second material images which have been selected and the selection condition row which has been selected.

18 Claims, 25 Drawing Sheets

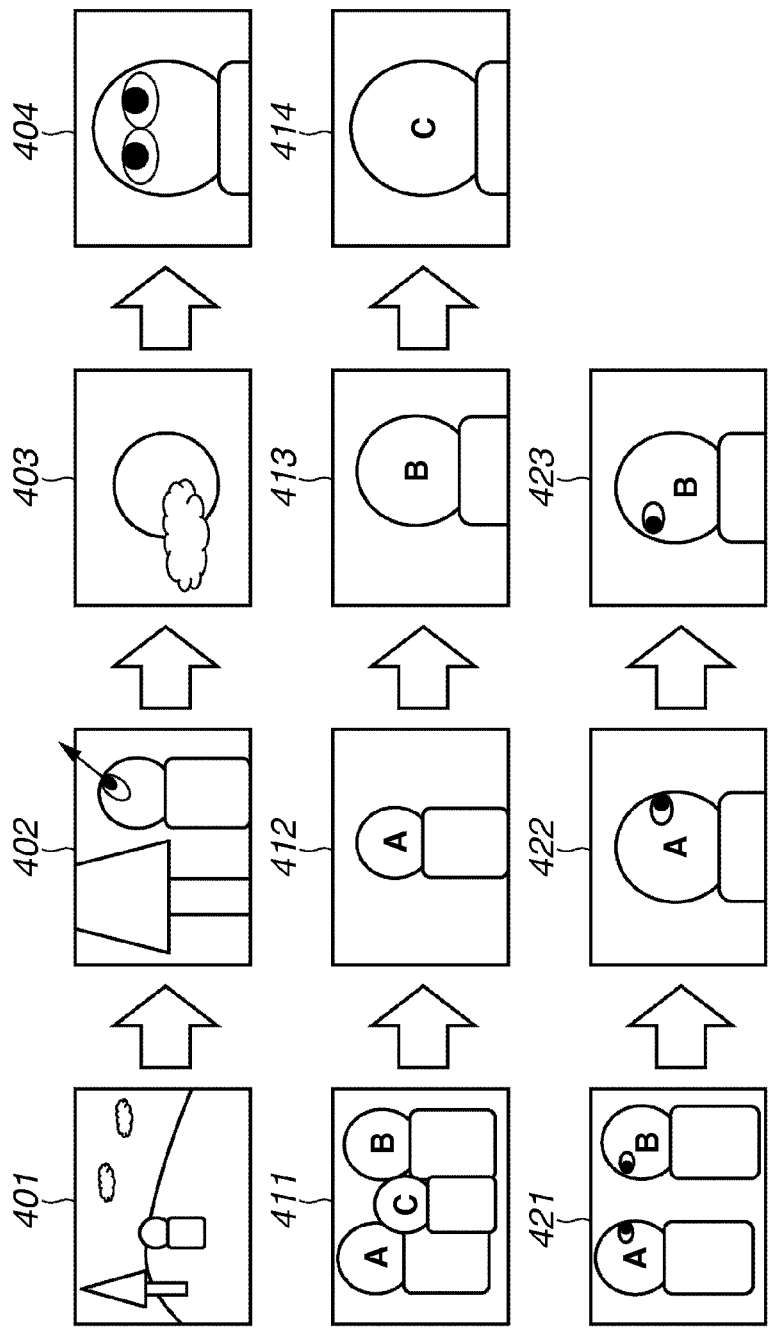

FIG.5

| | | Cut1 | Cut2 | Cut3 | Cut4 |
|---|---|---|---|---|---|
| Cut Type | | 0 | 0 | 0 | 1 |
| Position | Start | 0 | 4000 | 8000 | 12000 |
| | End | 4000 | 8000 | 12000 | 16000 |
| Condition1 | Type | FaceNumber | FaceNumber | FaceNumber | FaceNumber |
| | Value | 0 | 1 | 0 | 1 |
| Condition2 | Type | Location | FaceSize | Elevation of Camera | FaceSize |
| | Value | Cut4 | middle | 30 < | big |
| Condition3 | Type | — | Line of sight | Location | Line of sight |
| | Value | — | up | Cut4 | up |
| Condition4 | Type | — | Location | — | — |
| | Value | — | Cut4 | — | — |

| | | Effect1 | Effect2 | | |
|---|---|---|---|---|---|
| Effect Type | | Blur | Transform | | |
| Position | Start | 6000 | 4000 | | |
| | End | 10000 | 8000 | | |
| Parameter | Type | Strength | Scale | | |
| | Value | 10 | 20 | 1.2 | 1.5 | 2.0 |
| | Time | 6000 | 10000 | 4000 | 6000 | 8000 |

| | | transition1 | transition2 |
|---|---|---|---|
| Transition Type | | BlackOutIn | CrossFade |
| Position | Start | 2000 | 10000 |
| | End | 6000 | 14000 |

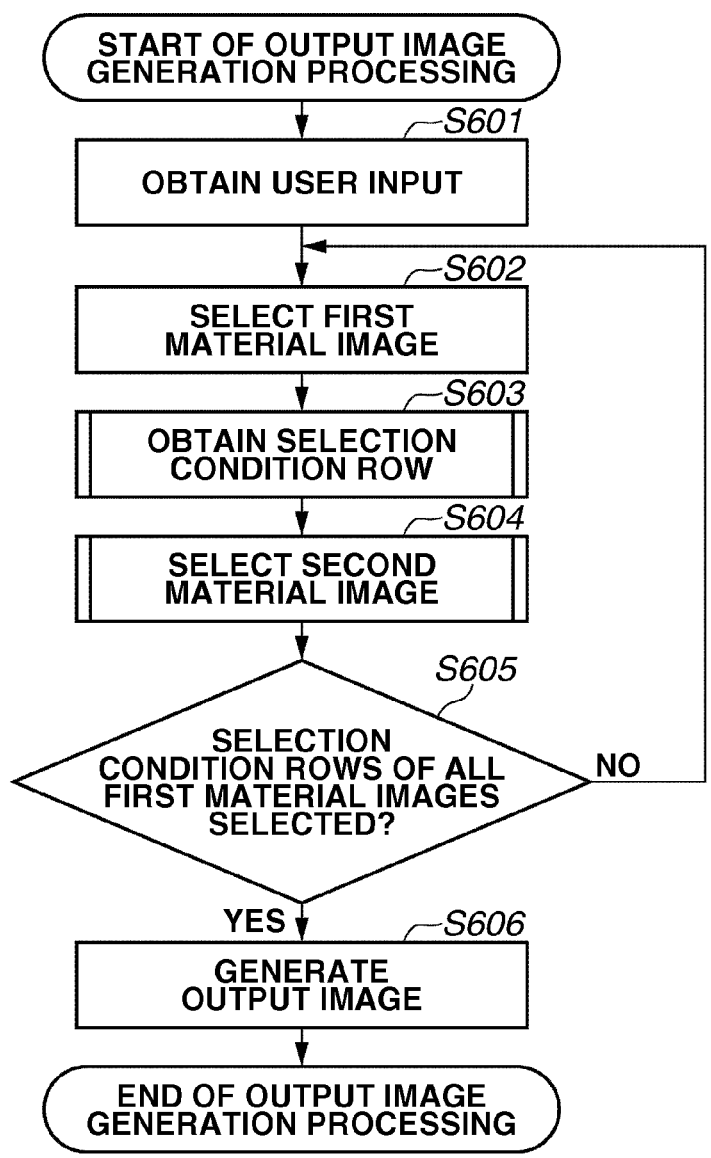

FIG.15

| Condition | | Base Condition | | Editing Function | |
|---|---|---|---|---|---|
| Type | Value | Type | Value | Type | Value |
| FaceSize | big | FaceSize | middle | Crop | big face size |
| FaceSize | big | FaceSize | small | Crop | big face size |
| FaceSize | middle | FaceSize | small | Crop | middle face size |
| ⋮ | | | | | |

FIG.21

| ARRANGEMENT ORDER | SELECTION CONDITION |
|---|---|
| 1 | SMALL FACE |
| 2 | USER-SELECTED MATERIAL IMAGE |
| 3 | BIG FACE |

| ARRANGEMENT ORDER | SELECTION CONDITION |
|---|---|
| 1 | USER-SELECTED MATERIAL IMAGE |
| 2 | SMALL FACE |
| 3 | BIG FACE |
| 2 | ... |
| 3 | ... |

| ARRANGEMENT ORDER | SELECTION CONDITION |
|---|---|
| 1 | ... |
| 2 | ... |
| 3 | ... |

FIG.24A 2401

| Effect Type | | Effect1 | Effect2 | | Effect3 | | ... |
|---|---|---|---|---|---|---|---|
| | | Soft Focus | Zoom-In | | Contrast Intensify | | ... |
| Condition | Type | Gender | Facial Expression | | Season | Location | ... |
| | Value | Female | Smile | | Summer | Beach | ... |
| Position | Start | 0 | 0 | | 0 | | ... |
| | End | 2,999 | 2,999 | | 2,999 | | ... |
| Parameter | Type | Strength | Speed | Center | Strength | | ... |
| | Value | 3 | 1 | Face | 7 | | ... |
| | Time | 0 | 0 | 0 | 0 | | ... |

FIG.24B 2402

| | Effect Type 1 | Effect Type 2 | Multiply |
|---|---|---|---|
| | Soft Focus | Zoom-In | Enable |
| | Soft Focus | Contrast Intensify | Disable |
| | Contrast Intensify | Zoom-In | Enable |
| | ... | ... | ... |

IMAGE GENERATION APPARATUS AND CONTROL METHOD

BACKGROUND OF THE INVENTION

1. Field of the Invention

The present disclosure relates to an image generation apparatus configured to generate an image and a control method thereof.

2. Description of the Related Art

In recent years, there is a growing need for generating an attractive output image such as a moving image or a slideshow by performing image editing on material images such as still images and moving images. Image editing includes, for example, selection, composing, and deletion of scenes using the material images, and applying effect and transition to the scenes. However, for users not used to generating output images, processing like selection, composing, and deletion of scenes, and designation of effect and transition is very challenging.

Thus, a tool that generates an output image in a full-automatic or a semiautomatic manner has been developed. A tool that generates an output image full-automatically needs only a material image to be processed and a template designated by a user in generating an output image. When receiving the material image and the template, the tool automatically generates an output image.

For example, a template discussed in Japanese Patent No. 4424389 includes a condition and an order of material images to be used and information of the effect/transition to be applied. Feature quantities of the material images are compared with the condition of the material image to be used described in the template. Then, the material images that match the condition are arranged in order and the designated effect/transition is applied to the material images. In this manner, an output image is generated. Japanese Patent No. 4343027 discusses a method that selects a template with a theme that matches a theme set in advance to a material image to be processed and generates an output image using the template.

Regarding a tool for semi-automatically generating an output image, there is a tool that presents candidate material images to a user. Japanese Patent Application Laid-Open No. 2011-30159 discusses a method for calculating a recommendation degree of each material image concerning whether the image can be arranged at the (N+1)-th image from a relationship between a feature quantity of an N-th material image which is selected by a user and a feature quantity of a different material image. Then, based on the calculated recommendation degree, the user is provided with candidates of material images which can be arranged as the (N+1)-th image. The user selects an image from the candidates.

In the above-described Japanese Patent No. 4424389 and Japanese Patent No. 4343027, a user designates a template. However, if a material image that matches the condition of the template regarding the material image to be used does not exist, an output image that matches the content of the template cannot be generated. In addition according to these patent documents, designation of a template according to a theme is performed. However, in this case, since the feature quantity such as the composition of the material image is not considered, an output image that matches the material image may not be generated in some cases.

Further, according to the semiautomatic method discussed in Japanese Patent Application Laid-Open No. 2011-30159, only the correlation of the feature quantities between adjacent material images is considered. Thus, an output image of a scene with a story line including a plurality of cuts cannot be automatically generated. In this context, a cut is an interval where imaging is continuously performed in an output image. Further, a scene includes a plurality of cuts and has one meaning or one story.

The present invention is directed to realizing an image generation apparatus useful in easily generating an output image that matches a material image which a user desires to include and includes a plurality of scenes with an alignment order.

SUMMARY OF THE INVENTION

According to an aspect of the present disclosure, an image generation apparatus includes a storage unit configured to store a plurality of selection condition rows including a plurality of selection conditions used for selecting a material image from a plurality of material images, a first material image selection unit configured to select at least one material image from the plurality of material images as a first material image, a feature quantity obtaining unit configured to obtain a feature quantity of the first material image, a selection condition row selection unit configured to select a selection condition row including the obtained feature quantity from the plurality of selection condition rows stored in the storage unit, a second material image selection unit configured to select a second material image from the plurality of material images based on a selection condition of the selection condition row which has been selected, and an output image generation unit configured to generate an output image based on the first and the second material images which have been selected and the selection condition row which has been selected.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIGS. 4A to 4C illustrate examples of a thumbnail of each cut included in an output image generated from a selection condition row.

FIG. 5 is a schematic diagram illustrating a data structure of the selection condition row.

FIG. 6 is a flowchart illustrating output image generation processing.

FIG. 15 illustrates a table of editing information pieces of material image editing processing.

FIG. 21 illustrates a plurality of selection condition rows.

FIGS. 24A and 24B are schematic diagrams illustrating a data structure of information of effects of a selection condition row and information indicating whether the effects can be superimposed according to a fifth exemplary embodiment of the present invention.

DESCRIPTION OF THE EMBODIMENTS

The accompanying drawings, which are incorporated in and constitute a part of the specification, illustrate exemplary embodiments, features, and aspects of the invention and, together with the description, serve to explain the principles of the disclosure.

Figure 1:
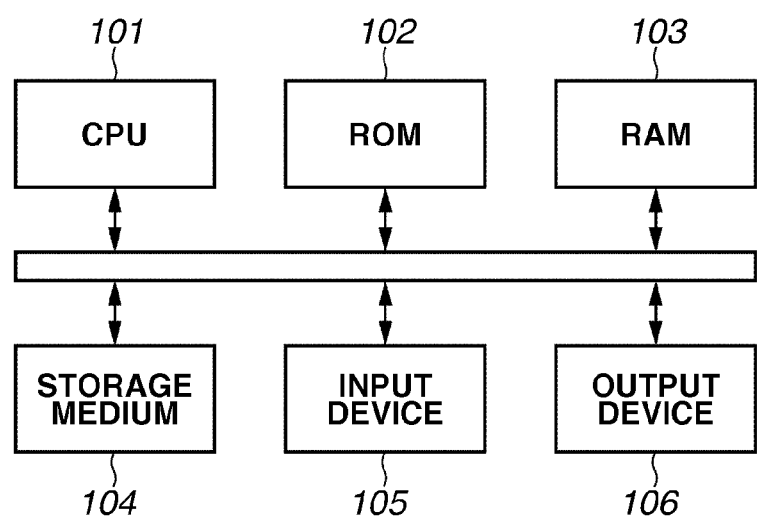
FIG. 1 illustrates a hardware configuration of an image generation apparatus.

An image generation apparatus according to a first exemplary embodiment of the present disclosure is described below with reference to the drawings. FIG. 1 illustrates a hardware configuration of an image generation apparatus according to the first exemplary embodiment.

A central processing unit (CPU) 101 is responsible for all processing of each unit of the image generation apparatus. The CPU 101 reads a command stored in a read-only memory (ROM) 102 or a random access memory (RAM) 103 in order, interprets the command, and executes processing according to the result of the interpretation. Processing in flowcharts described below is performed by the CPU 101. A program, data, and a working area necessary for the processing performed by the CPU 101 are provided by the ROM 102 and the RAM 103 to the CPU 101.

A storage medium 104 for storing image data is a hard disk, a CompactFlash (CF) card, a Secure Digital (SD) card, a universal serial bus (USB) memory, a memory card, or the like. An input device 105 is a device such as a touch screen and receives an instruction input by a user. An output device 106 displays images and characters. A liquid crystal display is widely used for such an output device. Further, the output device 106 can include a touch panel function. In that case, the output device can also be used as the input device 105.

Figure 7:
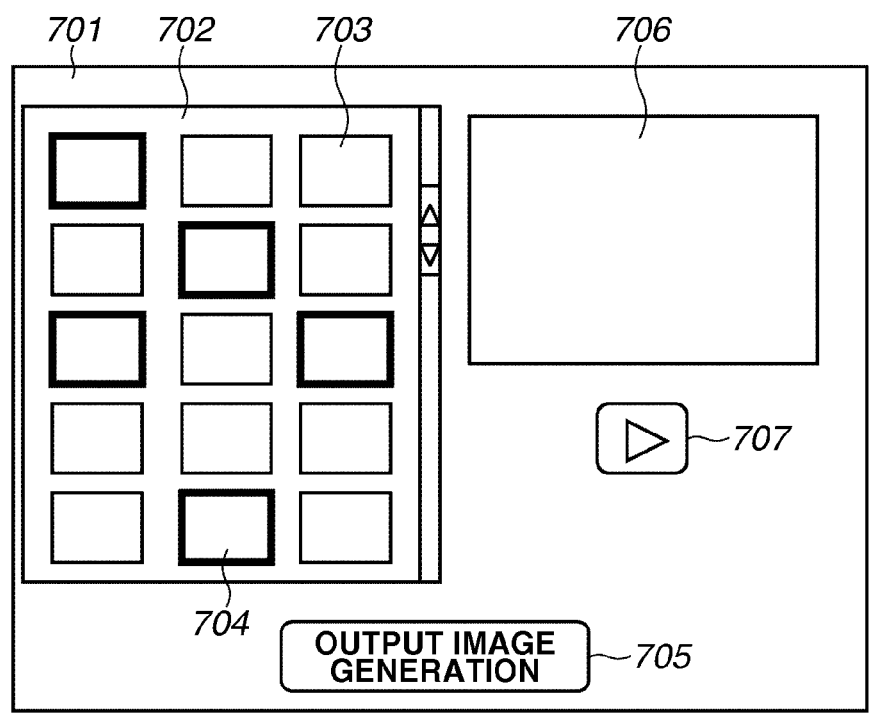
FIG. 7 illustrates a user interface (UI) screen of the image generation apparatus.

FIG. 7 illustrates a user interface (UI) screen of the image generation apparatus according to the present exemplary embodiment. A window 701 is a UI screen of the image generation apparatus according to the present exemplary embodiment. A list of thumbnails 703 of material images is displayed in an area 702. When a user selects a thumbnail he/her desires to use, a frame of the selected thumbnail is thickened as illustrated by a thumbnail 704.

An output image generation start button 705 is used for starting output image generation processing according to the present exemplary embodiment. An area 706 is where an output image obtained as a result of the output image generation processing is reproduced. A button 707 is a playback button used for starting playback of the output image which is obtained as a result of the output image generation processing. The output image is a moving image or a slideshow. A slideshow is data for displaying a plurality of moving images or still images in a predetermined order and a time length.

Figure 23:
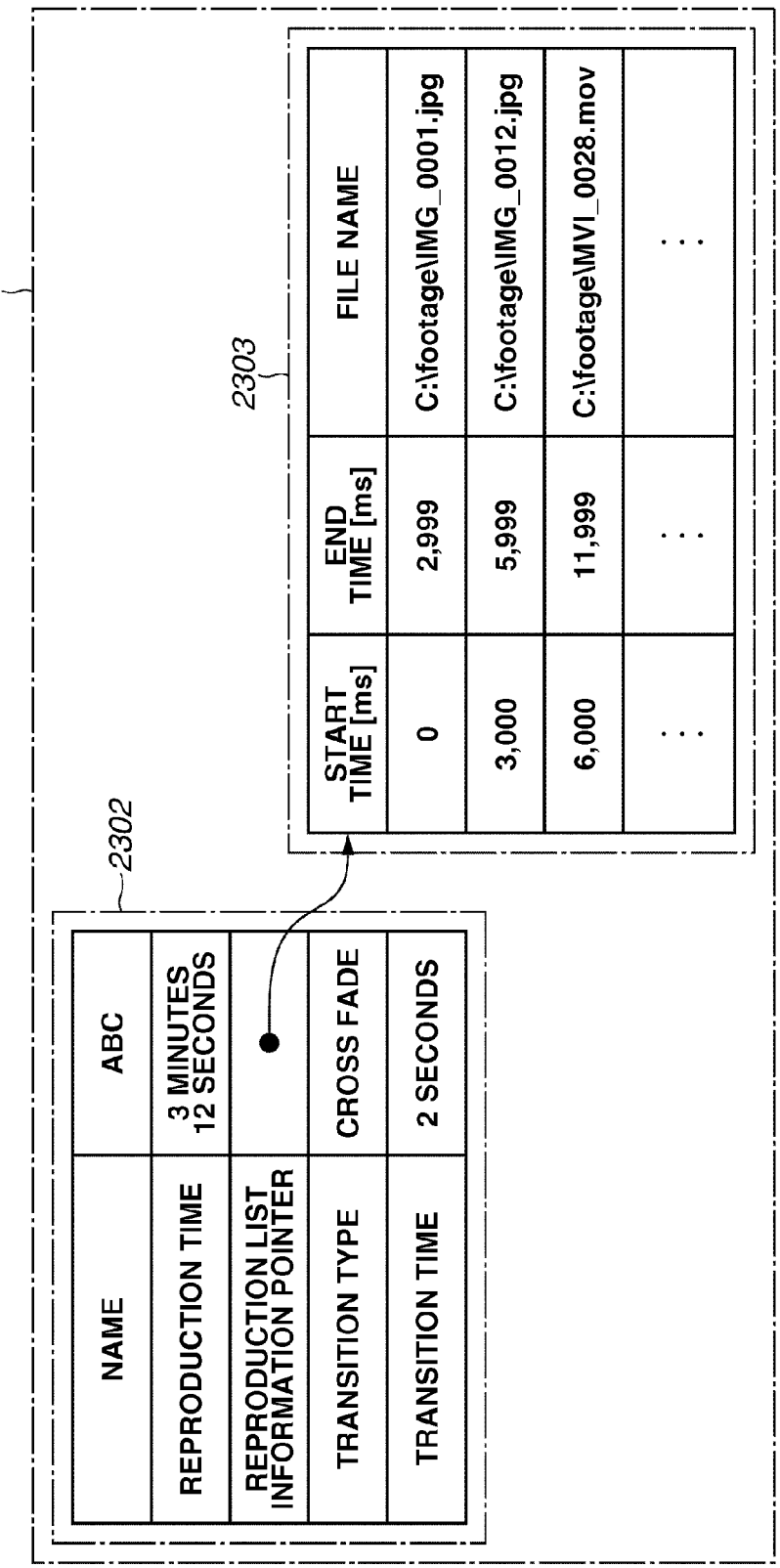
FIG. 23 is a schematic diagram illustrating a data structure of a slideshow.

FIG. 23 is a schematic diagram of a data structure of a slideshow. A data structure 2301 of the slideshow includes slideshow attribute information 2302 and playback list information 2303. The slideshow attribute information 2302 includes a name of the slideshow, a playback time, a pointer to the playback list information 2303, a transition type, and a transition time. The playback list information 2303 includes a start time and an end time of a moving image or a still image and a file name of the moving image or the still image when one moving image or still image is displayed. The beginning of the slideshow is set to zero.

In FIG. 23, a slideshow with a name of "ABC" has a playback time of "3 minutes 12 seconds". Its transition type is "crossfade" and its transition time is "2 seconds". Further, files "C:\ footage\IMG_0001.jpg", "C:\footage\IMG_0012.jpg", and "C:\footage\MVI_0028.mov" are displayed from 0 to 2,999 milliseconds, 3,000 to 5,999 milliseconds, and 6,000 to 11,999 milliseconds, respectively.

When one moving image or still image is switched over to another image, image processing which is designated by the transition type and time is performed. In FIG. 23, cross-fade of two seconds is performed. The cross-fade is image processing for synthesizing images by gradually reducing the opacity of a previous moving image or still image while gradually increasing the opacity of a following moving image or still image. The data structure and the values described above are examples and the present invention is not limited to such examples.

Figure 2:
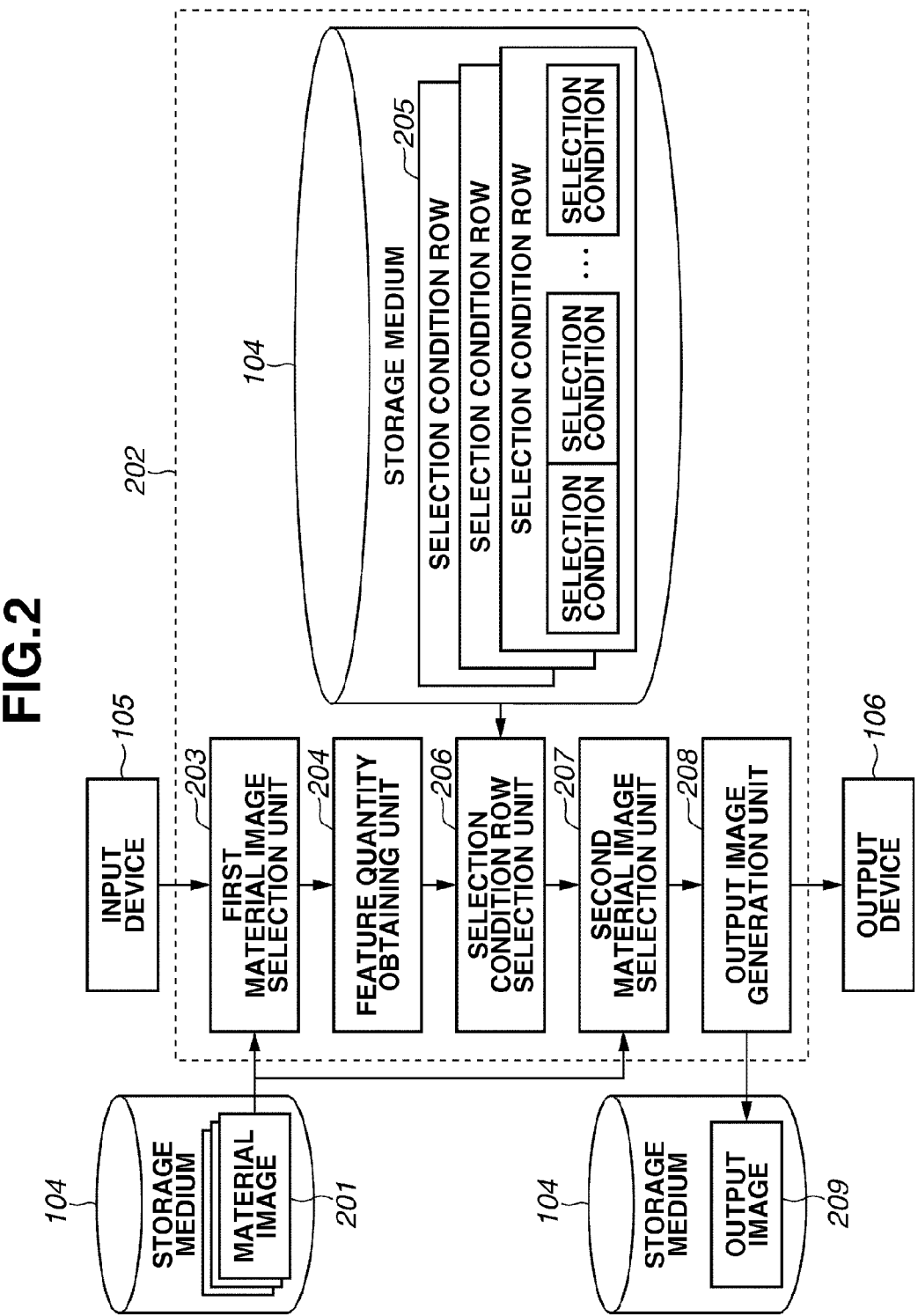
FIG. 2 is a functional block diagram of the image generation apparatus.

FIG. 2 illustrates a functional block diagram of the image generation apparatus. Processing of each unit will be described below. A material image 201 is a still image or a moving image data.

Figure 3:
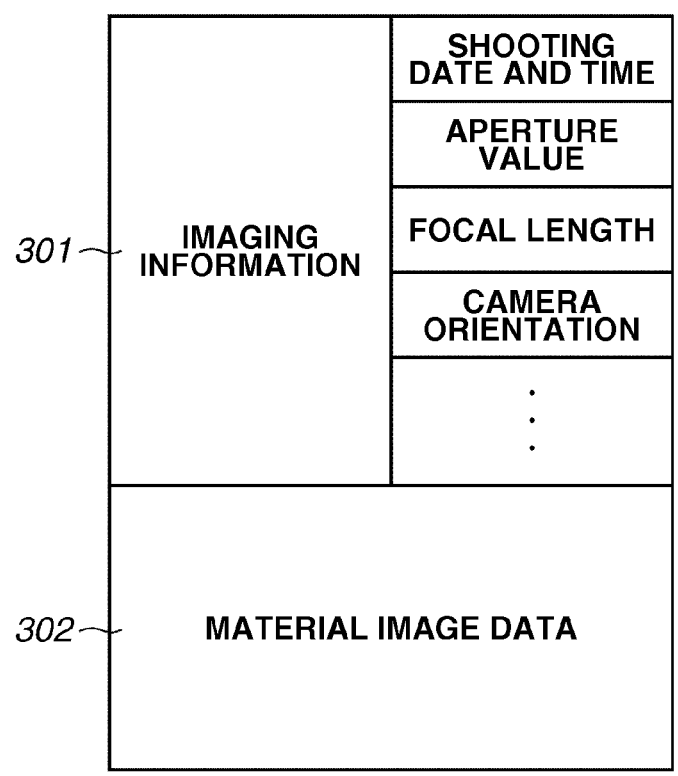
FIG. 3 is a schematic diagram illustrating a data structure of a material image.

FIG. 3 illustrates a data structure of the material image 201. The material image 201 has an exchangeable image file format (Exif) including imaging information 301 and material image data 302. The shooting date and time can be obtained from a clock integrated in the camera. Information of the aperture value and the focal length can be obtained from lens information. The camera orientation can be obtained from a value detected by a gyroscopic sensor integrated in the camera.

Referring back again to FIG. 2, the first exemplary embodiment is further described. An image generation apparatus 202 is an image generation apparatus according to the present exemplary embodiment. A first material image selection unit 203 selects a material image designated by a user as a first material image. Although the user directly designates the first material image according to the present exemplary embodiment, the user can designate a feature quantity of the material image as a selection condition. Then, based on the designated selection condition, the first material image can be selected.

The feature quantity is information indicating various features of the material image. The feature quantity information can be obtained from the Exif data attached to the material image or from an analysis result of the material image. Information pieces such as a shooting date and time, an imaging apparatus name, resolution, an imaging direction, a shutter speed, an aperture, an ISO sensitivity, a light metering mode, a focal length, and global positioning system (GPS) information can be obtained from the Exif data. Further, the feature quantities regarding a number of faces, a face size, human figure recognition, and a line of sight direction can be obtained from the analysis results based on the face detection, human figure recognition, and line of sight detection. The feature quantities can be obtained by a different analysis. For example, voice detection or smile detection can be used. Further, although the feature quantity can be obtained by performing the analysis processing each time, it can be obtained in advance and stored in the storage medium 104 in association with the material image.

A feature quantity obtaining unit 204 obtains the feature quantity of the first material image. A selection condition row 205 is data concerning a generation pattern of an output image. The selection condition row 205 includes at least a selection condition of the material image to be used in each cut of the output image and arrangement position information that defines the alignment order of the material images. The storage medium 104 includes a plurality of selection condition rows 205. Although the selection condition is described below, it is, for example, an imaging location, a number of faces, or a face size.

FIGS. 4A to 4C illustrate concrete examples of the output images, which are generated by applying the selection condition row. FIG. 4A is a generation pattern for effectively expressing an action/reaction of an object. A first cut 401 is a long shot of an imaging location describing the state of the location. In a second cut 402, the object gazes up at something. A third cut 403 shows the moon, which is what the object gazes up in the cut 402. A fourth cut 404 is a close-up of the object and expresses the feeling of the object.

FIG. 4B is a generation pattern which can be used for introducing a character. A cut 411 is a group photograph. Cuts 412, 413, and 414 are used for introducing the persons appeared in the cut 411.

FIG. 4C illustrates a generation pattern for realizing a natural output image by matching the directions of line of sight in cuts. A cut 421 is a long shot of a person A and a person B facing each other. In a cut 422, the person A is looking at the same direction the person A is looking at in the cut 421. In a cut 423, the person B is looking at the same direction the person B is looking at in the cut 421. These are merely examples and the present exemplary embodiment is not limited to such examples.

FIG. 5 illustrates a data structure of the selection conditions. A table 501 includes the selection conditions of a material image. A CheckFlag item 502 is used for determining the selection condition for determining whether a target material image includes the feature quantity of the first material image in the processing described below. The selection condition having a CheckFlag value set to "1" is subjected to the determination. Details of the determination are described below.

A Position item 503 indicates a display position of each cut in a time sequence. "Start" indicates the start time of the cut and "End" indicates the end time of the cut. The time is expressed in milliseconds. A Condition item 504 indicates a condition for selecting the material image and shows the feature quantity required for the material image to be selected. For example, "Location" indicates the imaging location. If a value same as the one for the Cut 4 is to be used, "Cut 4" is set to "Value". "FaceNumber" indicates the number of faces. "FaceSize" indicates a face size. "Line of Sight" indicates the direction of the line of sight. "Elevation of Camera" indicates an elevation angle of the camera. If a value of 30 degrees or greater is to be set, it is set as "30<" using the inequality sign. These selection conditions are merely examples, and not limited to the above-described examples.

In a table 505, effect information is described. An Effect Type item 506 indicates the type of the effect. "Blur" indicates the effect of blur and "Transform" indicates the effect of basic modification such as "enlarge", "reduce", "move", and "rotate". Other effects can also be used. A Position item 507 indicates a range to which the effect is applied. "Start" indicates a start position of the effect, and "End" indicates an end position of the effect. Time is expressed in milliseconds. A Parameter item 508 is the parameter of the effect. For example, "Type" indicates a parameter type. "Value" indicates a parameter value. "Time" indicates a time corresponding to the value of "Value" when the value of the parameter changes according to time passage.

A table 509 includes transition information. A Transition Type item 510 indicates a type of the transition. "BlackOutIn" indicates the transition regarding black out/in. "CrossFade" indicates the transition regarding cross-fade. Other transitions can also be used. A Position item 511 indicates a range to which the transition is applied. "Start" indicates a start position of the transition, and "End" indicates an end position of the transition.

These three tables 501, 505, and 509 configure one set of the selection condition rows. The storage medium 104 includes a plurality of generation patterns regarding the selection condition rows. Although a data structure of the generation pattern is described above, the present exemplary embodiment is not limited to such an example. For example, only the table 501 can be used as the selection condition row.

Referring back again to FIG. 2, the first exemplary embodiment is further described. A selection condition row selection unit 206 selects the selection condition row including the feature quantity of the first material image as the selection condition of which CheckFlag item 502 is "1".

The above-described selection method of the selection condition row is a merely example, and the selection method is not limited to the above-described example. For example, the determination can be performed using all the selection conditions and then the selection condition row which satisfies at least one selection condition can be selected. Further, a selection condition row where all the material images that satisfy each condition row of the selection condition row may be selected.

The selection condition row may be selected by a user if a plurality of selection condition rows is selectable, and a selection condition row with the higher priority may be selected based on a priority added to the selection condition row in advance.

The priority may be changed according to a determination result of a selection frequency, a selection interval, and arrangement from the selection history of the selection condition rows. For example, if a same selection condition row is continuously selected, the priority of the selection condition row is lowered.

In addition, the priority may be set for each piece of theme information provided by the user. The theme information is, for example, atmospheric information such as a tempo of the cut change or a note of a background music (BGM) of the output image as a result of the generation. For example, if the tempo is fast, the priority of the selection condition row including many cuts which are changed quickly may be raised.

Further, the priority may be determined based on the position of the output image which is generated by applying the selection condition row in the time sequence of the output image as a result of the generation. For example, if the output image generated by applying the selection condition row is arranged in the early stage, the priority of the selection condition row such as the one illustrated in FIG. 4B that introduces the characters may be raised.

A second material image selection unit 207 selects a second material image based on a selection condition of the selection condition row 205 which has been selected. An output image generation unit 208 arranges the first and the second material images based on the selection condition row 205 which has been selected, generates an output image 209, and stores the output image in the storage medium 104 or outputs it to the output device 106. If a plurality of the first material images is selected, the output image generation unit 208 arranges the first material images in the order designated by the user to generate the output image. Such an arrangement is a merely example and the present exemplary embodiment is not limited to the above-described example. For example, the output image can be generated so that the first material images are arranged in the order of the shooting date and time.

Figure 17:
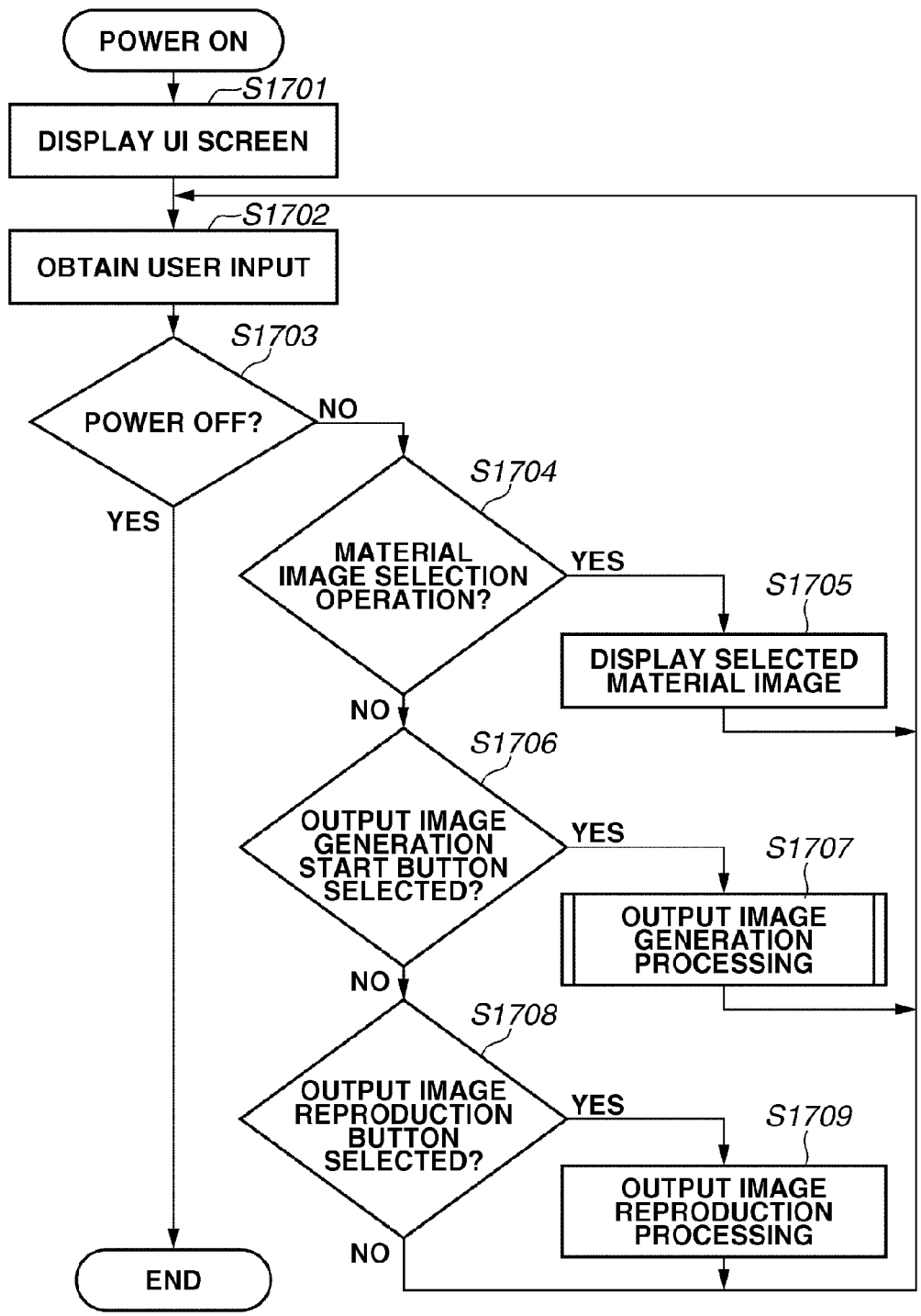
FIG. 17 is a flowchart illustrating processing corresponding to a UI operation of the image generation apparatus.

FIG. 17 is a flowchart illustrating processing corresponding to the UI operation of the image generation apparatus according to the first exemplary embodiment. In step S1701, when the power is supplied, the CPU 101 displays the window 701. In step S1702, the CPU 101 obtains a user input to the input device 105. In step S1703, the CPU 101 determines whether the user input is turning off the power. In step S1703, if the user input is not turning off the power (NO in step S1702), the processing proceeds to step S1704. In step S1704, the CPU 101 determines whether the user input is an operation regarding material image selection. In step S1704, if the user input is the material image selection operation (YES in step S1704), the processing proceeds to step S1705. In step S1705, the frame of the thumbnail of the selected material image is thickened. Then, the processing returns to step S1702 to obtain the user input.

In step S1704, if the user input is not the material image selection operation (NO in step S1704), the processing proceeds to step S1706. In step S1706, the CPU 101 determines whether the user has pressed the output image generation start button 705. In step S1706, if the CPU 101 determines that the user has pressed the output image generation start button 705 (YES in step S1706), the processing proceeds to step S1707. In step S1707, the CPU 101 starts the output image generation processing. Then, the processing returns to step S1702. Details of the output image generation processing will be described below.

In step S1706, if the CPU 101 determines that the user has not pressed the output image generation start button 705 (NO in step S1706), the processing proceeds to step S1708. In step S1708, the CPU 101 determines whether the user has pressed the button 707 being the output image playback button. If the CPU 101 determines that the user has pressed the output image playback button 707 (YES in step S1708), the processing proceeds to step S1709. In step S1709, the CPU 101 reproduces the output image which is generated by the output image generation processing just before step S1707. In step S1708, if the CPU 101 determines that the user has not pressed the output image playback button 707 (NO in step S1708), the processing returns to step S1702, and the user input is obtained. If the user input is power OFF (YES in step S1703), then the processing ends.

FIG. 6 is a flowchart illustrating the output image generation processing of the image generation apparatus in step S1706 according to the first exemplary embodiment. In step S601, after the output image generation processing is started, the CPU 101 receives a user input. In step S602, based on the user input obtained in step S601, the CPU 101 selects the material image selected by the user as a first material image. In step S603, the CPU 101 obtains a selection condition row based on the feature quantity of the first material image. Details of the selection condition row selection processing will be described below. In step S604, the CPU 101 selects a second material image based on the selected selection condition row. Details of the selection condition selection processing will be described below.

In step S605, the CPU 101 determines whether the selection condition rows of all the first material images have been selected. If the CPU 101 determines that the selection condition rows of all the first material images have not yet been selected (NO in step S605), the processing returns to step S602, and the next first material image selection processing is performed. If the CPU 101 determines that the selection condition rows of all the first material images have been selected (YES in step S605), the processing proceeds to step S606. In step S606, the CPU 101 performs the output image generation processing. The output image generation processing is to arrange the selected first and the second material images based on the selected selection condition rows to generate an output image, and store the generated output image in the storage medium 104. Then, the output image generation processing ends.

Figure 8:
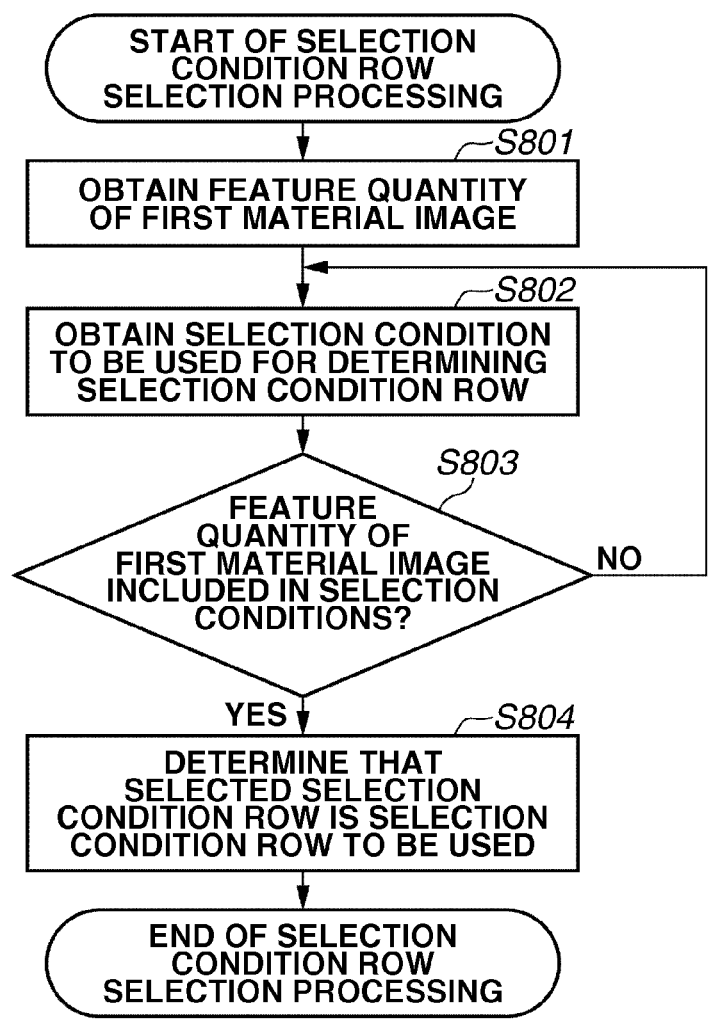
FIG. 8 is a flowchart illustrating selection condition row selection processing.

FIG. 8 is a flowchart illustrating the selection condition selection processing performed in step S603. In step S801, the CPU 101 obtains a feature quantity of the first material image. In step S802, the CPU 101 obtains a selection condition of which CheckFlag item 502 is "1" as a selection condition for the determination. In step S803, the CPU 101 determines whether the feature quantity of the first material image is included in the selection condition obtained in step S802. If the CPU 101 determines that the feature quantity of the first material image is not included in the selection condition (NO in step S803), the processing returns to step S802, and the next selection condition for the determination of the selection condition row is obtained. On the other hand, if the CPU 101 determines that the feature quantity of the first material image is included in the selection condition (YES in step S803), the processing proceeds to step S804. In step S804, the CPU 101 determines that the selected selection condition row is the selection condition row to be used, and then the selection condition row selection processing ends.

Figure 9:
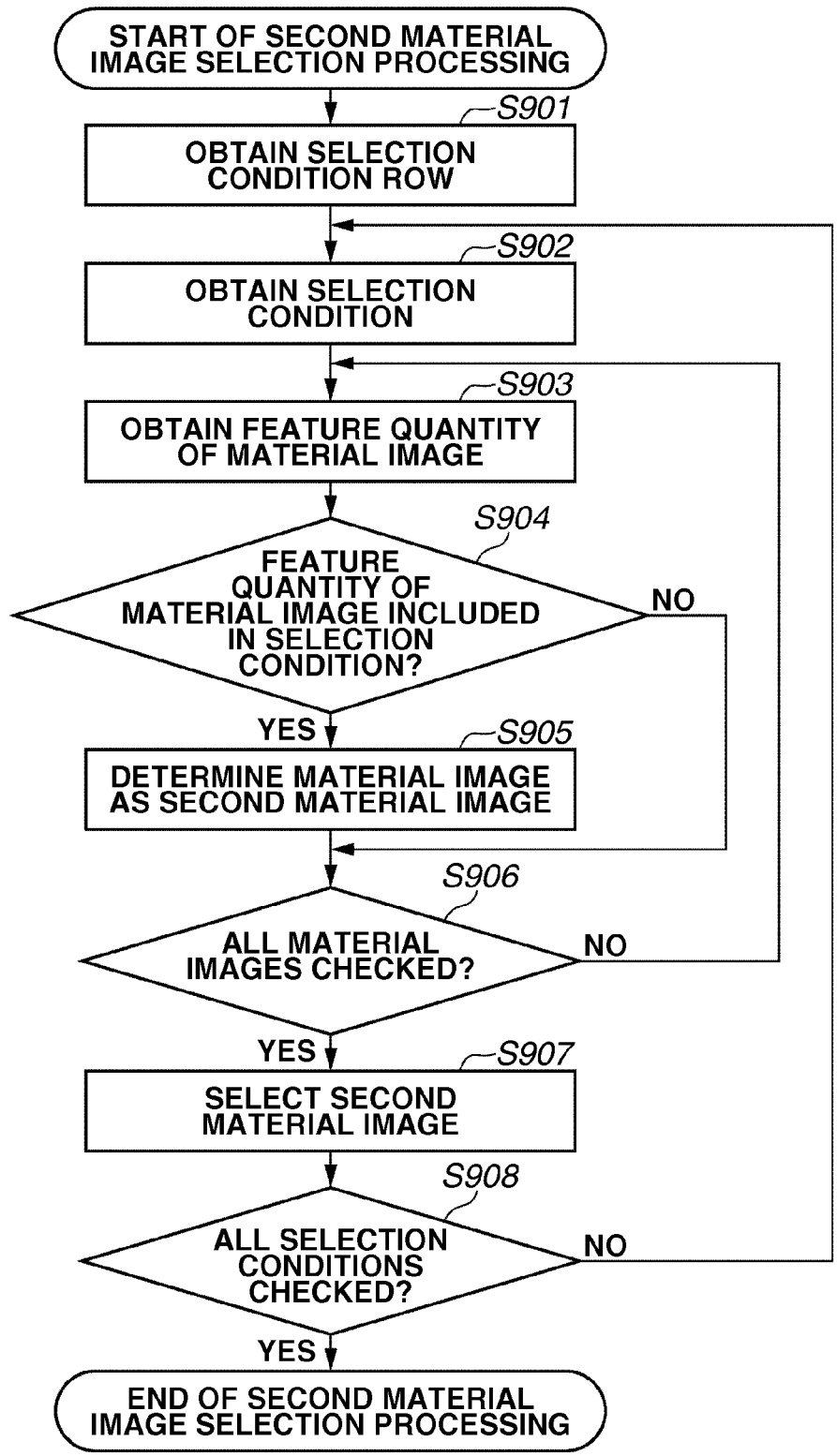
FIG. 9 is a flowchart illustrating second material image selection processing.

FIG. 9 is a flowchart illustrating the second material image selection processing performed in step S604 in FIG. 6. When the second material image selection processing is started, in step S901, the CPU 101 obtains the selection condition row selected in step S603. In step S902, the CPU 101 obtains a selection condition other than the selection condition determined as including the feature quantity of the first material image in step S803 from the selection condition row. In step S903, the CPU 101 obtains a feature quantity of a material image.

In step S904, the CPU 101 determines whether the feature quantity of the material image is included in the selection condition. If the feature quantity of the material image is included in the selection condition (YES in step S904), the processing proceeds to step S905. In step S905, the CPU 101 determines that the material image is the second material image. In step S906, the CPU 101 determines whether checking of all the material images is finished. If all the material images is not yet checked (NO in step S906), the processing returns to step S903, and the feature quantity of the next material image is obtained.

In step S906, if it is determined that all the material images are checked (YES in step S906), the processing proceeds to step S907. In step S907, from among the material images which have been determined as the second material images, the CPU 101 selects a material image of which shooting date and time is closest to that of the first material image as the second material image.

The above described processing is an example and the present exemplary embodiment is not limited to such an example. For example, the material image which is firstly determined as the second material image can be determined as the second material image. For example, in another embodiment of the present invention the criteria for selecting which material image among the plurality of material images that were checked may be different. An exemplary criteria, may be to stop the search and select a second material image once a material image has been identified which meet the selection condition. In another alternative, all the material images are not checked, and the second material images is selected form an incomplete subset of images that meet the selection condition.

Further, priority of each material image can be calculated by performing weighting of the feature quantity of the material image. Then, the material image with a high priority can be selected as the second material image. In step S908, the CPU 101 determines whether all the selection conditions have been checked. If all the selection conditions have not yet been checked (NO in step S908), the processing returns to step S902, and the next selection condition is obtained. On the other hand, if all the selection conditions have been checked (YES in step S908), the second material image selection processing ends.

In step S606, the output image is generated by arranging all the selected material images in one sequence. Although the selection condition rows are connected in a normal order, the order of the selection condition rows may be determined in advance, or the order can also be changed according to a material image between two selection condition rows.

According to the above-described configuration and processing, an output image that matches the material images and includes a plurality of scenes with an alignment order can be easily generated.

Further, not all of the material images are selected by the user as the output image, and since other material images are automatically selected from the material images selected by the user, the number of operations performed by the user can be reduced.

A second exemplary embodiment will be described with reference to drawings. Descriptions of parts similar to those of the first exemplary embodiment are not repeated.

Figure 10:
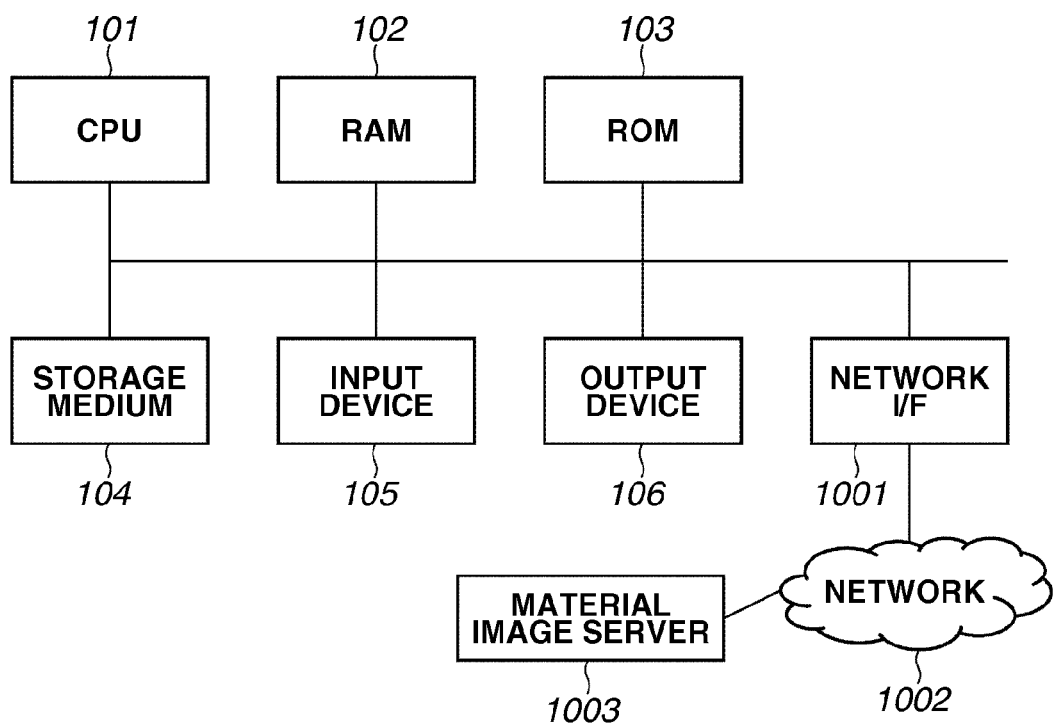
FIG. 10 illustrates a configuration of an image generation apparatus.

FIG. 10 illustrates a configuration of an image generation apparatus according to the second exemplary embodiment. A network I/F 1001 performs communication control so that, for example, the CPU 101 can receive image data information from a material image server 1003, which is an external server, via a network 1002.

Figure 11:
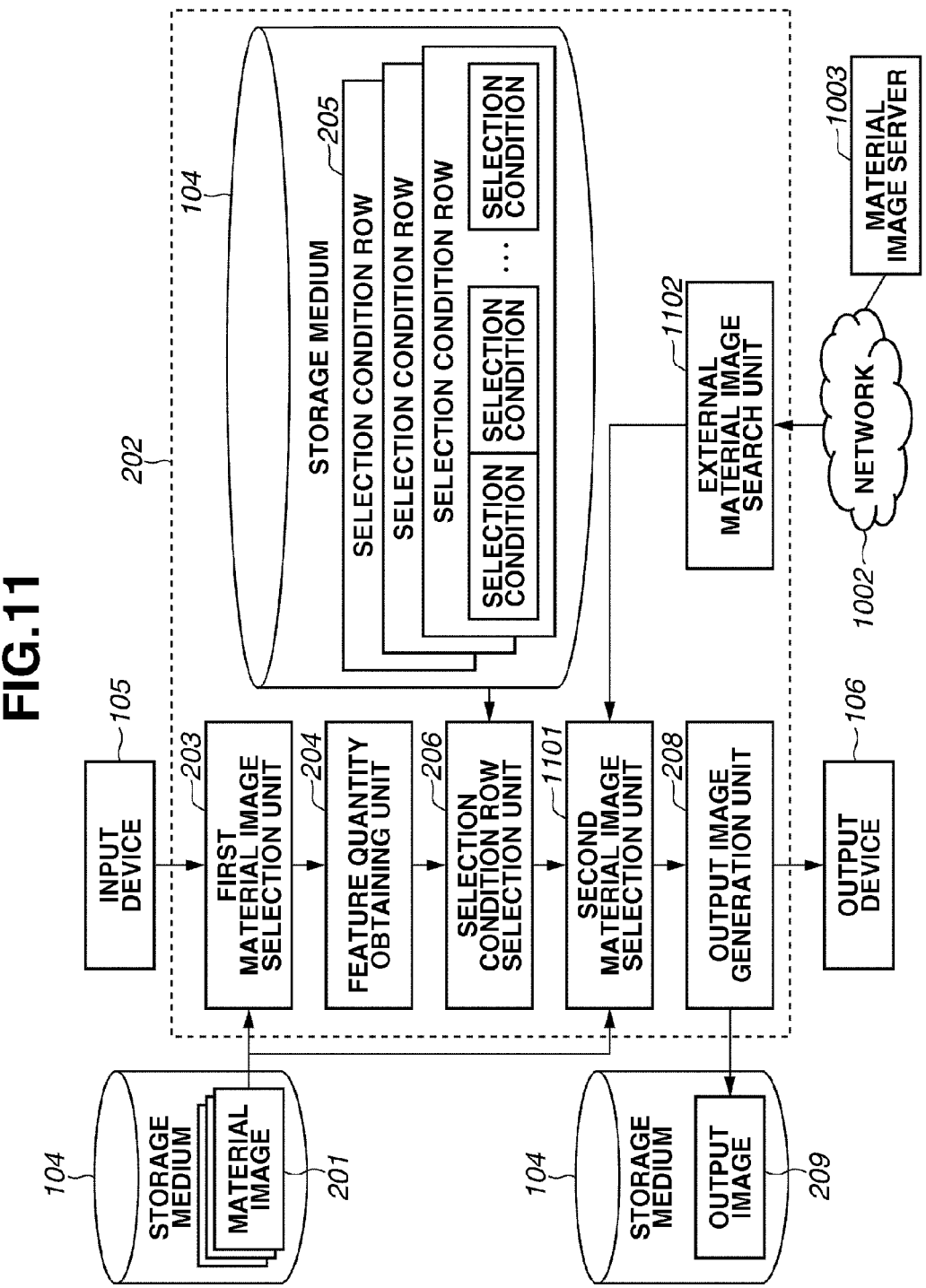
FIG. 11 is a functional block diagram of the image generation apparatus.

FIG. 11 illustrates a functional block diagram of the image generation apparatus according to the second exemplary embodiment. If the material image 201 that satisfies the selection condition is not stored in the storage medium 104, a second material image selection unit 1101 causes an external material image search unit 1102 to search the material image server 1003 via the network 1002 for a material image.

Figure 12:
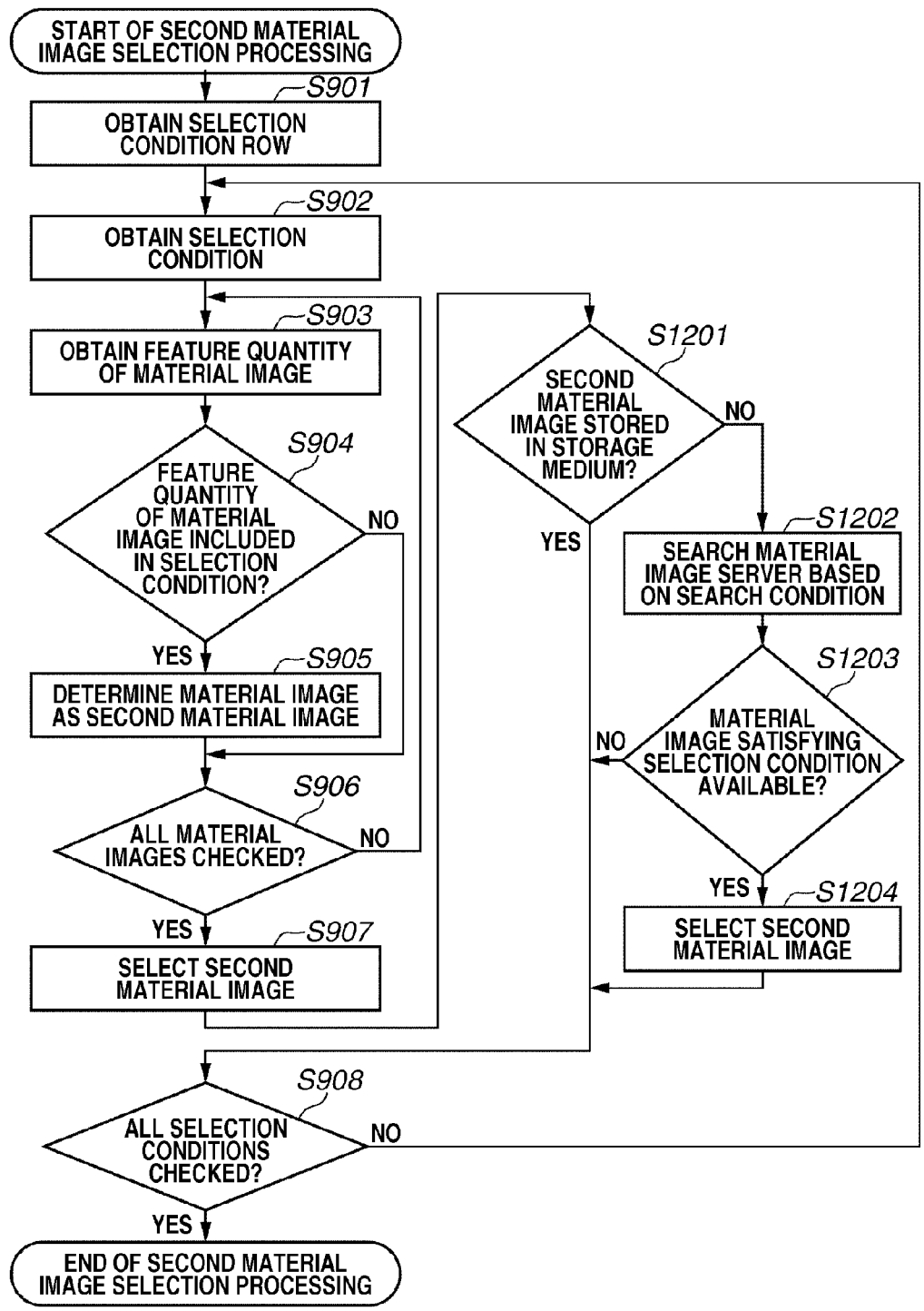
FIG. 12 is a flowchart illustrating second material image selection processing.

FIG. 12 is a flowchart illustrating neighborhood material image selection processing according to the second exemplary embodiment. In step S1201, the CPU 101 determines whether a second material image is stored in the storage medium 104. If a second material image is not stored in the storage medium 104 (NO in step S1201), the processing proceeds to step S1202. In step S1202, the CPU 101 searches the material image server 1003 based on the selection condition. In step S1203, the CPU 101 determines whether a material image that satisfies the selection condition is stored in the material image server 1003. If a material image that satisfies the selection condition is stored in the material image server 1003 (YES in step S1203), the processing proceeds to step S1204. In step S1204, the CPU 101 determines the material image in the material image server as the second material image.

According to the above-described configuration, even if a material image that satisfies the selection condition does not exist, an output image that matches the material image and includes a plurality of scenes with an alignment order can be easily generated.

A third exemplary embodiment will be described with reference to drawings. Descriptions of parts similar to those of the first and the second exemplary embodiments are not repeated.

Figure 13:
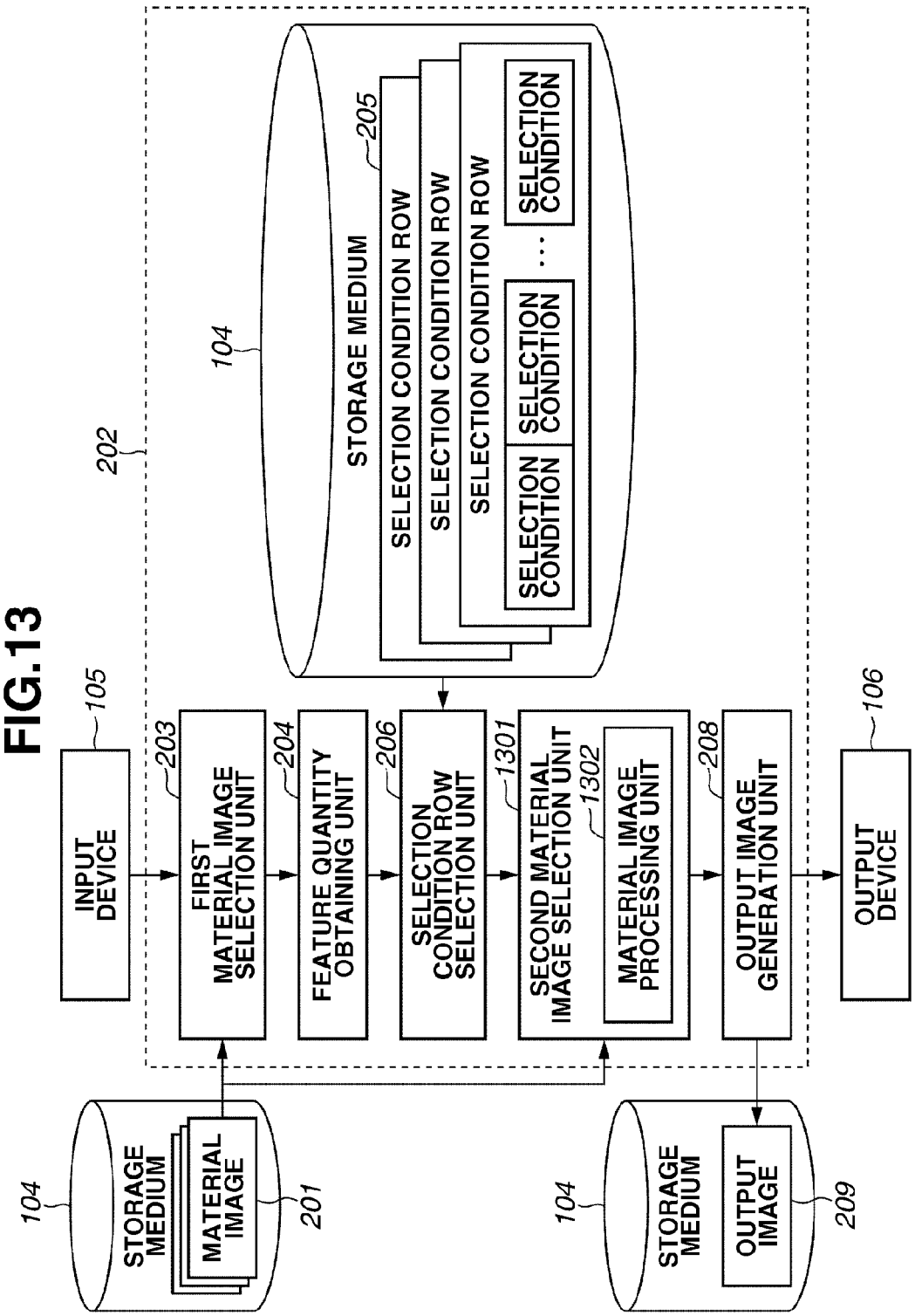
FIG. 13 is a functional block diagram of the image generation apparatus.

FIG. 13 is a functional block diagram of an image generation apparatus according to the third exemplary embodiment. If the feature quantity of a material image 201 does not match the selection condition, a second material image selection unit 1301 causes a material image processing unit 1302 to edit the material image so that the material image satisfies the selection condition, and selects the edited material image as the second material image.

Regarding the material image after editing, if a material image after editing is newly generated and the older material image after editing is no longer necessary, the older material image is deleted. For the determination of editing, a table including an editing base material image condition and editing contents which are associated with the selection condition is prepared in advance. Whether a material image can be edited is determined by referencing the table. The editing base material image condition is a condition of a material image used as an editing base.

Figure 14A:
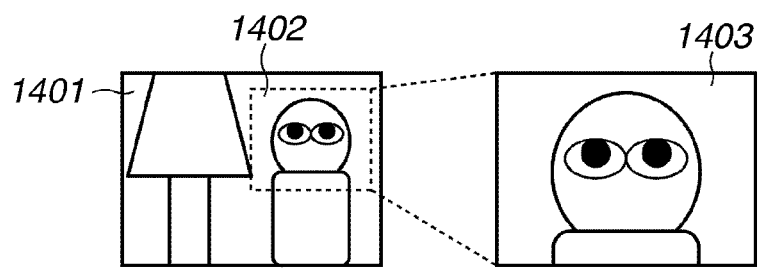
FIGS. 14A and 14B are schematic diagrams illustrating contents of material image editing processing.
Figure 14B:
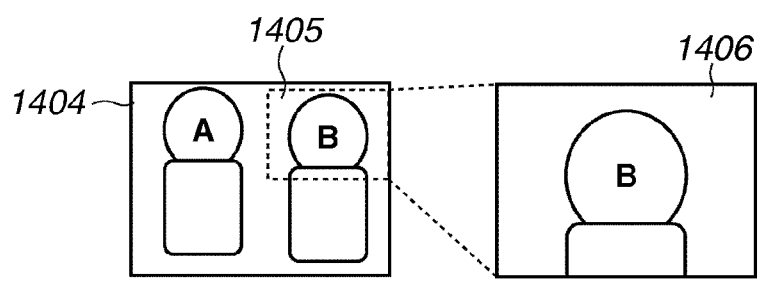

FIGS. 14A and 14B illustrate examples of processing results of the material image processing unit 1302. A material image 1401 and a material image 1404 are material images before editing. Cropped regions 1402 and 1405 are respectively cropped from the material images 1401 and 1404. Material images 1403 and 1406 are material images after editing. According to such editing, a close-up material image can be generated from a long shot material image.

FIG. 15 is a table in which a condition of an editing base material image, an editing content, and a selection condition are associated with one another according to the third exemplary embodiment. A Condition item 1501 is a selection condition. A Base Condition item 1502 is a condition of the material image being the editing base. An Editing Function item 1503 is the editing content. The table in FIG. 15 is an example and the present exemplary embodiment is not limited to such an example.

Figure 16:
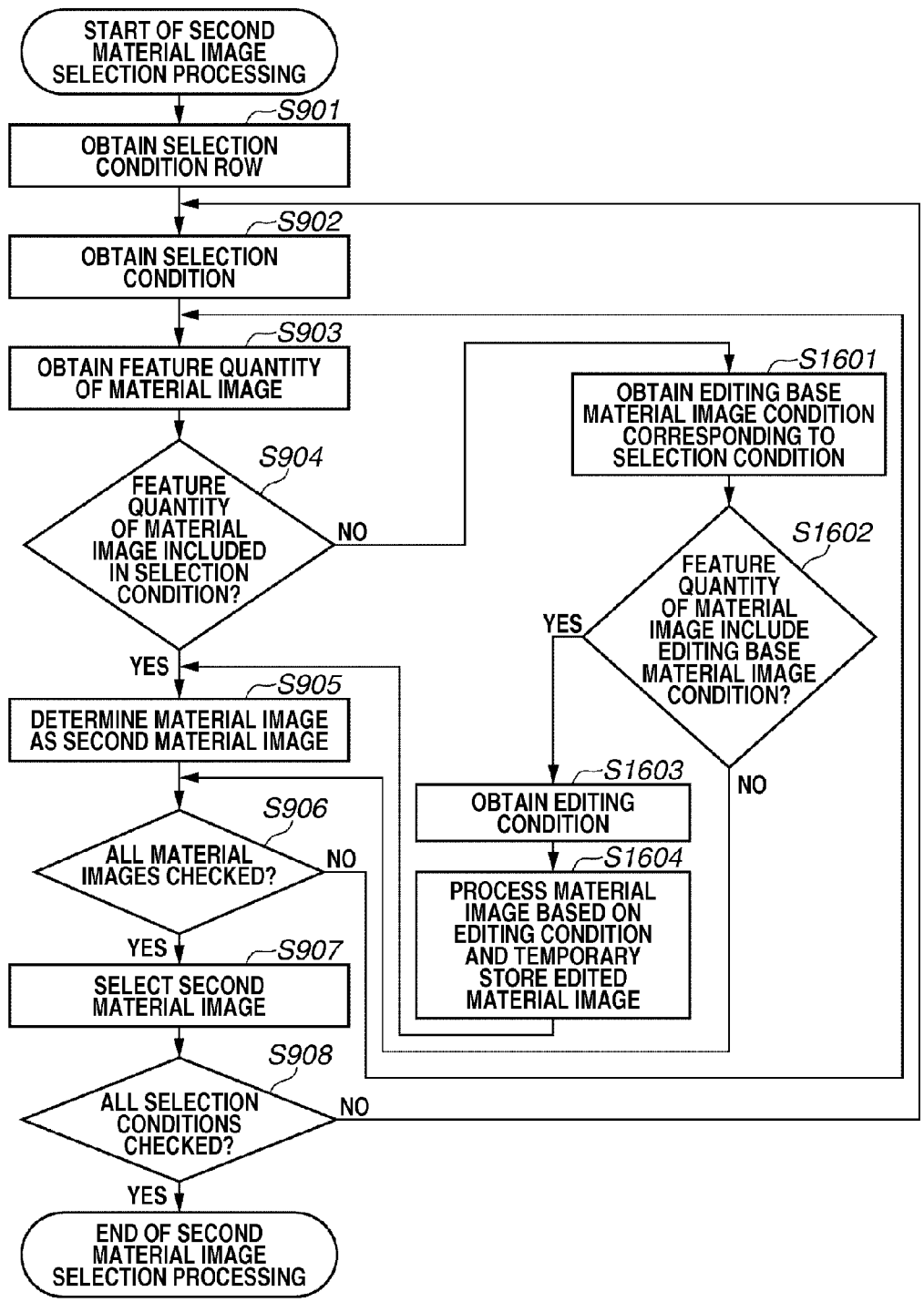
FIG. 16 is a flowchart illustrating second material image selection processing.

FIG. 16 is a flowchart illustrating neighborhood material image selection processing according to the third exemplary embodiment. In step S1601, the CPU 101 obtains the condition 1502 which is a condition of the material image being the editing base and corresponds to the selection condition. In step S1602, the CPU 101 determines whether the feature quantity of the material image includes the condition 1502 of the editing base material image. If the feature quantity of the material image includes the condition 1502 (YES in step S1602), the processing proceeds to step S1603. In step S1603, the CPU 101 obtains the editing condition 1503. In step S1604, based on the obtained editing condition, the CPU 101 edits the material image.

According to the above-described configuration and processing, even if the feature quantity of the material image does not match the selection condition, an output image that matches the material image and includes a plurality of scenes with an alignment order can be easily generated.

Next, a display screen of the image generation apparatus described in the first to the third exemplary embodiments above will be described as a fourth exemplary embodiment.

Figure 18:
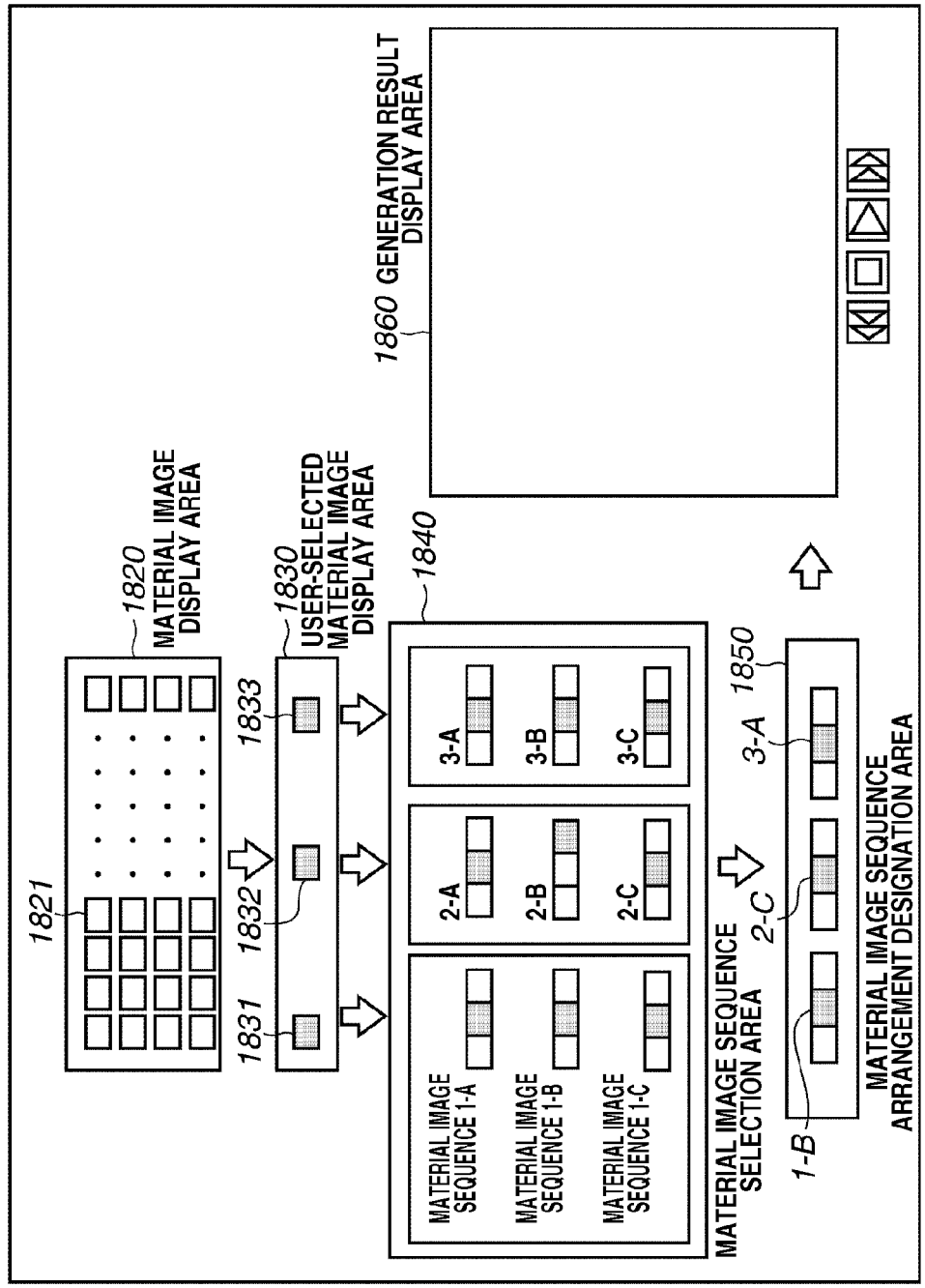
FIG. 18 illustrates a configuration of a display screen of the image generation apparatus.
Figure 19:
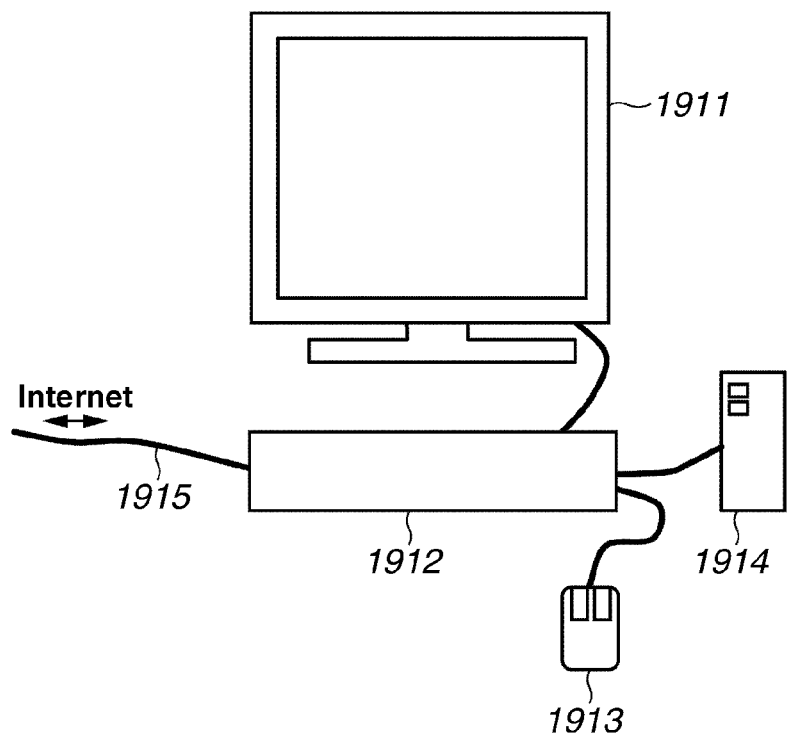
FIG. 19 illustrates a configuration of the image generation apparatus.

FIG. 18 illustrates a configuration of a display screen of the image generation apparatus according to the fourth exemplary embodiment. This screen corresponds to the screen of the output device 106 illustrated in FIG. 1. FIG. 19 illustrates a configuration of the display screen of the image generation apparatus according to the present exemplary embodiment.

A display device 1911 generates an output image and displays a display screen illustrated in FIG. 18. The display device 1911 includes a liquid crystal display or a cathode ray tube (CRT) display, and displays information when the user performs the selection operation and material images presented by the image generation apparatus. Although not illustrated, a computer 1912 includes a material image selection unit, a material image sequence generation unit, and an output image generation unit. The computer 1912 executes a program for generating an output image and controls processing of the above-described flow and processing in FIG. 20 described below. A mouse 1913 is an operation device used by a user to perform the selection operation.

A storage medium 1914 corresponds to the storage medium 104 in FIG. 1. A plurality of selection condition rows including arrangements of a plurality of selection conditions are stored in the storage medium 1914. The selection condition row includes conditions for selecting a material image such as a still image or a moving image used for generating an output image and a material image used for generating a candidate material image sequence presented by the image generation apparatus. Further, a program for generating the output image is stored in the storage medium 1914. A material image stored in a server on the Internet can also be stored in the storage medium 1914 via the Internet line 1915 and used for the generation of the output image.

Figure 20:
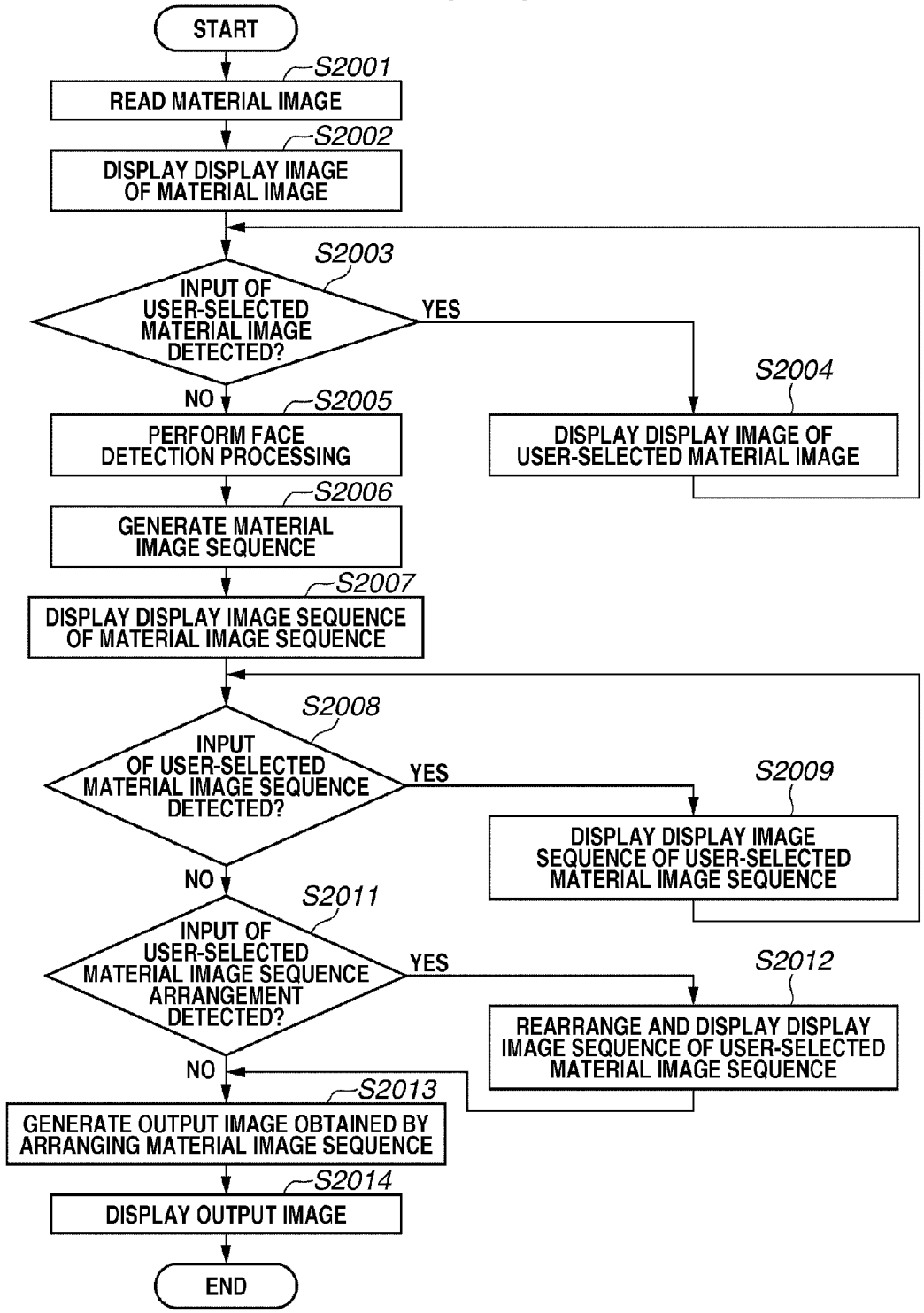
FIG. 20 is a flowchart illustrating output image generation processing.

FIG. 20 is a flowchart illustrating the output image generation processing.

The operation of the output image generation will be described with reference to the display screen illustrated in FIG. 18 and the flowchart in FIG. 20. When the output image generation processing is started, in step S2001, the CPU 101 reads a material image stored in the storage medium 1914. In step S2002, the CPU 101 generates a display image of the material image and displays it in a material image display area 1820.

By pushing a left button of the mouse 1913, the user selects a material image from display images 1821 of a plurality of material images which are displayed in a selectable manner in the material image display area 1820 (also referred to as a first display area) on the display screen. Accordingly, the material image selection unit selects the user-selected material image. In step S2003, when the image generation apparatus detects the input of the user-selected material image (YES in step S2003), the processing proceeds to step S2004. In step S2004, the image generation apparatus displays a display image 1831 of the user-selected material image which has been selected by the user in a user-selected material image display area 1830 on the display screen.

Processing in steps S2003 and S2004 is repeated by the user selecting the material images the user desires to use in generating the output image from the material image display area 1820 in order using the mouse 1913. Accordingly, the display images 1831 to 1833 of a plurality of user-selected material images are displayed in the user-selected material image display area 1830 (also referred to as a third display area).

In step S2005, the image generation apparatus performs face detection processing with respect to the display images 1831 to 1833 of the user-selected material images. In the face detection processing, the size of each face is classified into big, medium, and small to distinguish the human figure captured in the display image. Then, by using the result of the face detection, a material image sequence is generated. The material image sequence is an output image which is generated by arranging each user-selected material image in a sequence. In step S2006, the material image sequence generation unit generates a material image sequence using the result of the face detection obtained in step S2005.

For example, the material image sequence is generated based on the selection condition row stored in the storage medium 1914. In the selection condition row, the selection conditions of the material image and conditions of arrangements of the selected material images are described. A plurality of selection condition rows describing the arrangement order and the selection conditions is provided as illustrated in FIG. 21. The selection condition row describes the condition of the material images to be selected from the user-selected material images and their arrangement order to generate the material image sequence.

For example, material images including a face same as the face of a human figure in the user-selected material image identified by the face detection are selected. Then, a material image with a small face is arranged as the first image. The user-selected material image is arranged as the second image, and a material image with a big face is arranged as the third image. Then, these images are connected to form an image sequence. In this manner, based on the selection condition of the material image and the arrangement condition of the selected material images, a plurality of image sequences are generated for each material image which has been selected.

In step S2007, with respect to each of the display images 1831 to 1833 of the user-selected material images, a plurality of corresponding material image sequences are displayed in a material image sequence selection area 1840 (also referred to as a second display area) on the display screen. In FIG. 18, image material sequences for display 1-A, 1-B, 1-C and 2-A, 2-B, 2-C, and 3-A, 3-B, 3-C are arranged and displayed in the material image sequence selection area 1840.

The material image sequence for display which is displayed in the material image sequence selection area 1840 can be displayed by arranging thumbnail images of the material images in an arrangement order. If the material image includes a still image and a moving image, a moving image with a reduced size can be displayed next to a thumbnail of a still image. Although the material image sequence is generated and displayed after all the material images are selected according to the present exemplary embodiment, the generation and the display of the material image sequence can be performed each time a corresponding material image is selected.

Next, from the image material sequences for display 1-A, 1-B, and 1-C in the material image sequence selection area 1840 on the display screen, the user selects a user-selected material image sequence corresponding to the display image 1831 of the user-selected material image by clicking the left button of the mouse 1913. In step S2008, when the image generation apparatus detects the input of the user-selected material image sequence (YES in step S2008), the processing proceeds to step S2009. In step S2009, the image generation apparatus displays a display image sequence of the user-selected material image sequence 1-B selected by the user in the user-selected material image display area 1830 on the display screen.

Similarly, the user selects a user-selected material image sequence corresponding to the display image 1832 of the user-selected material image from a plurality of material image sequences 2-A, 2-B, and 2-C and a user-selected material image sequence corresponding to the display image 1833 of the user-selected material image from a plurality of material image sequences 3-A, 3-B, and 3-C.

The user-selected material image sequences 1-B, 2-C, and 3-A selected in this manner are displayed in a material image sequence arrangement designation area 1850 (also referred to as a fourth display area) in order. If the user desires to change the arrangement of the user-selected material image sequences, the user drags the material image the user desires to change from the material image sequence arrangement designation area 1850 by pressing the left button of the mouse 1913 and drops it at the desirable position by releasing the left button.

In step S2011, when the image generation apparatus detects the input of the arrangement of the user-selected material image sequence (YES in step S2011), the processing proceeds to step S2012. In step S2012, the image generation apparatus rearranges and displays the display image sequence of the user-selected material image sequence. In step S2013, the output image generation unit generates an output image by arranging the material image sequences designated by the user. In step S2014, the output image is displayed in a generation result display area 1860 on the display screen. Below the generation result display area 1860, there are provided, from left to right, fast-rewind, stop, playback, and fast-forward buttons. By operating these buttons, the output image can be previewed.

As described above, if the user selects a material image from the material images, a plurality of material image sequences are presented in which each of the user-selected material images is connected and arranged. Since the user can select a material image sequence from the plurality of material image sequences, the output image can be easily generated.

Further, since each display area is provided on the same screen, the user can perform processing on the image by a drag-and-drop operation without changing the display screen. Accordingly, operability is good.

According to the present exemplary embodiment, the user selects a material image from the material image display area 1820 by clicking the left button of the mouse 1913. If the user desires to change the once selected user-selected material image, the user may perform the following operation. For example, the user selects a user-selected material image 1831 to be deleted from the user-selected material images displayed in the user-selected material image display area 1830 illustrated in FIG. 18 by clicking a right button of the mouse 1913. Then, the material image is deleted.

Figure 22:
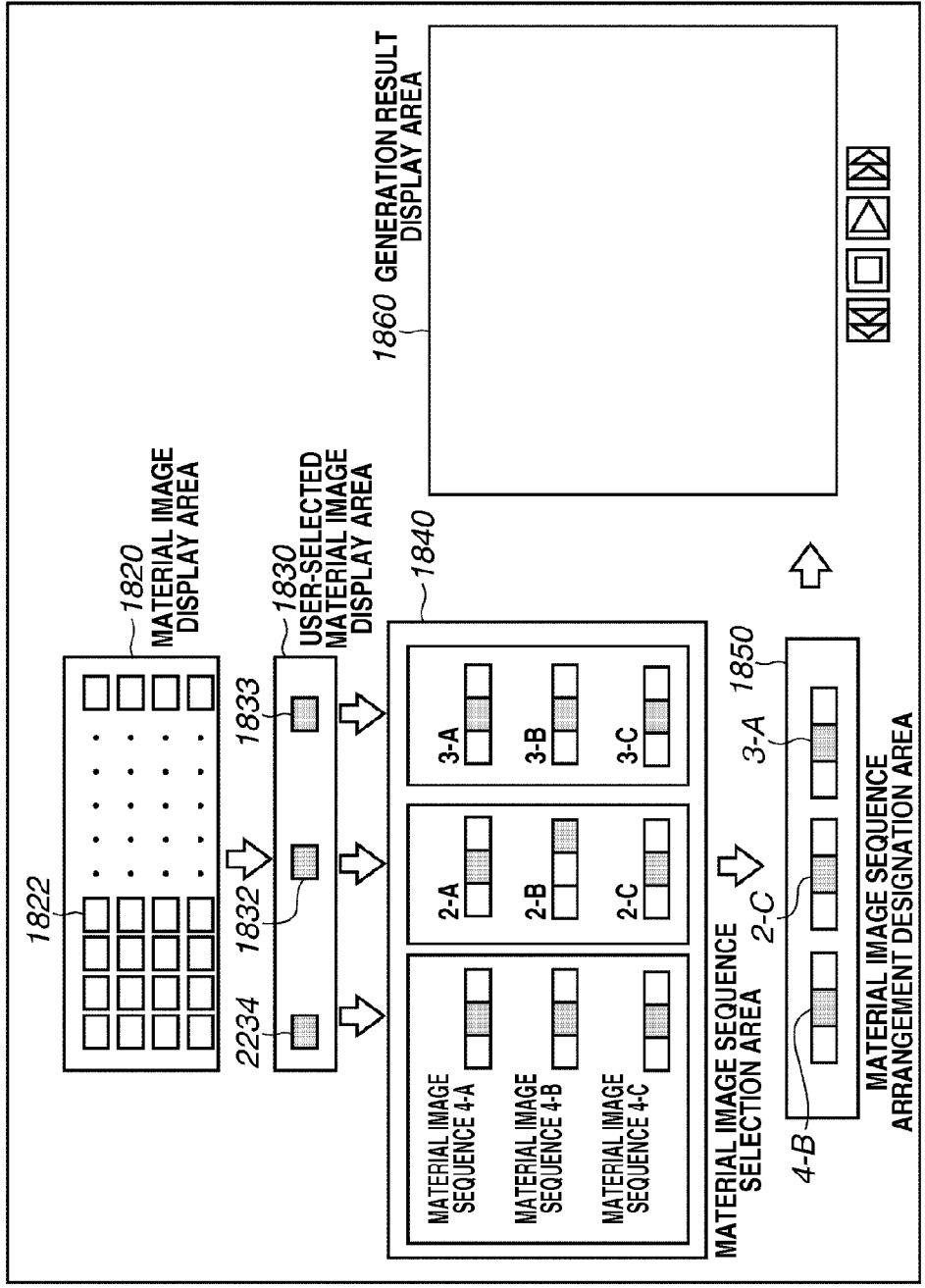
FIG. 22 illustrates a display screen of the image generation apparatus which is displayed when a user-selected material image is replaced.

Next, the user selects a user-selected material image to be replaced from the material image display area 1820 by clicking it with the left button of the mouse 1913. Then, as illustrated in FIG. 22, a newly selected user-selected material image 2234 is arranged and displayed in place of the deleted display image 1831 of the user-selected material image in the user-selected material image display area 1830. In association with the change of the user-selected material image, the material image sequences 1-A, 1-B, and 1-C in the material image sequence selection area 1840 are replaced with material image sequences 4-A, 4-B, and 4-C that correspond to the user-selected material image 2234.

Further, the user-selected material image sequence 1-B in the material image sequence arrangement designation area 1850 is replaced with the user-selected material image sequence 4-B. Thus, if the user does not desire to change the material image sequence 4-B displayed in the second position in the material image sequence selection area as the material image sequence that corresponds to the user-selected material image 2234, the user does not need to select the material image sequence again.

Further, according to the present exemplary embodiment, a result of the face detection is used in the selection condition described in the selection condition row, however, other information can be used as the selection condition. For example, the shooting date and time, or position information obtained by the GPS information can be used as the selection condition. Furthermore, the selection condition is not limited to the result of the face detection and can be a combination of the above-described conditions.

As described above, an output image that matches the material image which the user desires to use and includes a plurality of scenes with an arrangement order can be easily generated by a drag-and-drop operation.

An image generation apparatus according to a fifth exemplary embodiment will be described based on drawings. Since the hardware configuration of the present exemplary embodiment is similar to the one described with reference to FIG. 1 according to the first exemplary embodiment, the functional block diagram is similar to the one described with reference to FIG. 2 according to the first exemplary embodiment, and the data structure of the material image is similar to the one described with reference to FIG. 3 according to the first exemplary embodiment, their descriptions are not repeated. Further, since the selection condition and transition information about the selection condition row are similar to the information described with reference to the tables 501 and 509 in FIG. 5 according to the first exemplary embodiment, the output image generation processing is similar to the processing described with reference to FIG. 6 according to the first exemplary embodiment, and the UI screen is similar to the screen described with reference to the screen illustrated in FIG. 7 according to the first exemplary embodiment, their descriptions are not repeated. Further, in FIGS. 24A, 24B, and 25, components and parts same as those described in other exemplary embodiments are denoted by the same reference numerals and their descriptions are not repeated.

FIG. 24A is a schematic diagram illustrating a data structure of effect information of a selection condition row of the image generation apparatus according to the present exemplary embodiment. In FIG. 24A, a table 2401 that presents the effect information is similar to the table 505 in FIG. 5 according to the first exemplary embodiment except that a Condition item is added. The Condition item is used for adding an effect to a material image. A corresponding effect is applied to a material image having the feature quantity in the condition. The "Condition" includes feature quantities of "Type" and "Value". The Type indicates a type and the Value indicates a value of the feature quantity.

According to the example in FIG. 24A, if a material image from 0 to 2,999 milliseconds has a "Gender" type and its "Value" is "Female", "Effect Type" of "Soft Focus" is applied. Further, if the feature quantity of "Type" is "Facial Expression" and "Value" is "Smile", "Effect Type" of "Zoom-In" is applied. Furthermore, if the feature quantity of "Type" is "Season" and "Value" is "Summer" as well as "Type" is "Location" and "Value" is "Beach", the effect of "Contrast Intensify" will be applied.

"Soft Focus" is image processing for synthesizing, for example, an original image and a blurred image obtained by Gaussian blur processing. Further, "Zoom-In" is image processing for cropping an image and gradually reducing the region according to time passage. Further, "Contrast Intensify" is image processing for enhancing the contrast of the image. These are merely examples and the present exemplary embodiment is not limited to such examples.

FIG. 24B is a schematic diagram illustrating a data structure of information indicating whether effects regarding the selection condition row can be multiplied according to the image generation apparatus of the present exemplary embodiment. In FIG. 24B, a table 2402 includes information regarding whether effects can be multiplied. More precisely, the table 2402 includes items "Effect Type 1" and "Effect Type 2" that indicate the effect type and Multiply that indicates whether the effects of the Effect Type 1 and the effect of the Effect Type 2 can be used together. If the effects of the both types can be used together, "Multiply" will be "Enable". If not, "Multiply" will be "Disable".

According to the example in FIG. 24B, "Soft Focus" and "Zoom-In" can be used together, but "Soft Focus" and "Contrast Intensify" cannot be used together. Further, "Contrast Intensify" and "Zoom-In" can be used together. These are merely examples and the present exemplary embodiment is not limited to such examples.

Figure 25:
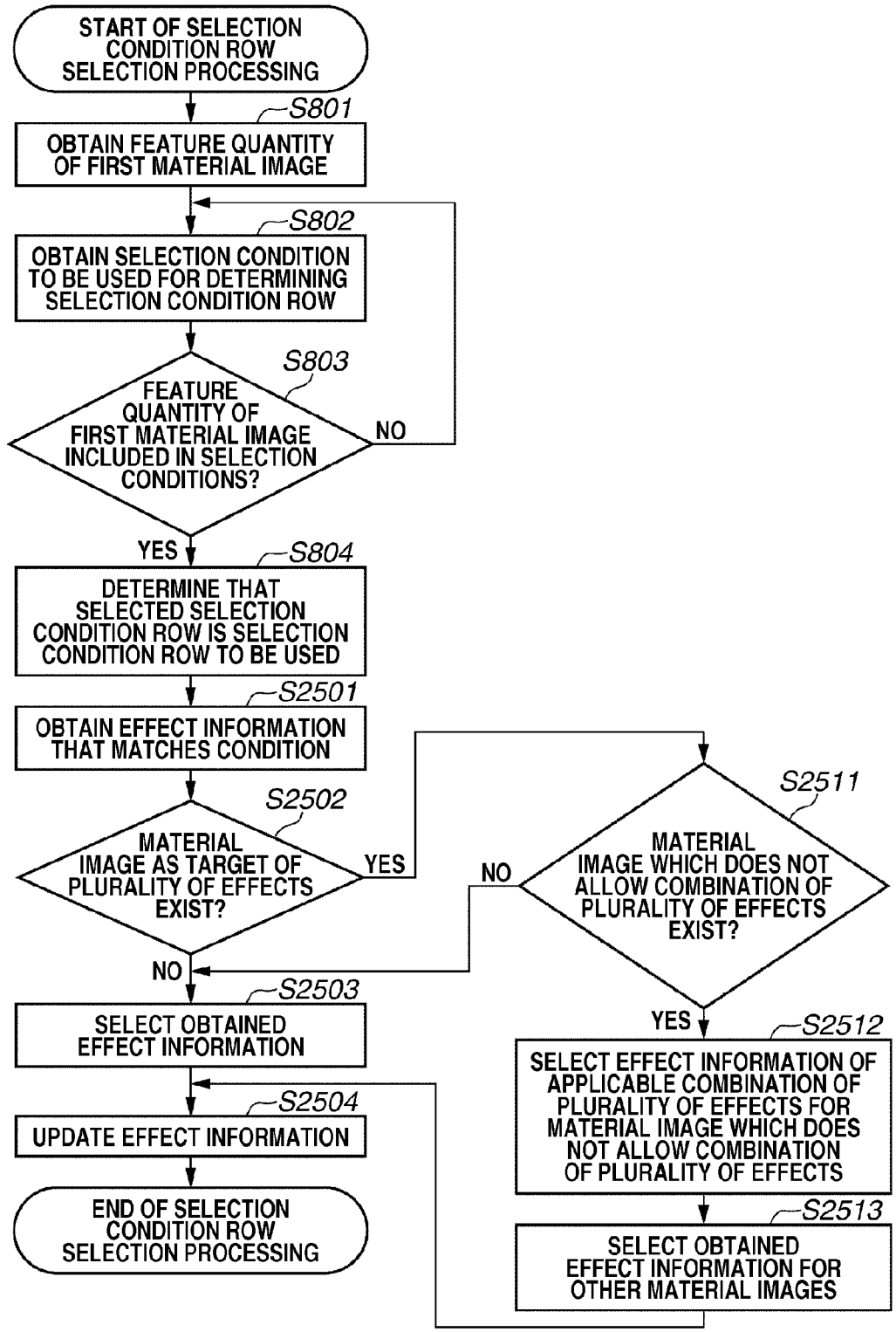
FIG. 25 is a flowchart illustrating selection condition row selection processing according to the fifth exemplary embodiment.

FIG. 25 is a flowchart illustrating the selection condition row selection processing of the image generation apparatus according to the present exemplary embodiment. In step S2501, the CPU 101 obtains effect information that matches the condition. More specifically, the effect information in which feature quantity of the material image selected from the selection condition row matches Condition in the table 2401 is obtained.

In step S2502, the CPU 101 determines whether a material image as a target of a plurality of effects exists. If such a material image does not exist (NO in step S2502), the processing proceeds to step S2503. In step S2503, the CPU 101 selects the effect information obtained in step S2501. In step S2504, the CPU 101 updates the effect information by replacing the old effect information with the effect information of the selection condition row.

On the other hand, in step S2502, if a material image as a target of a plurality of effects exists (YES in step S2502), the processing proceeds to step S2511. In step S2511, the CPU 101 determines whether a material image that does not allow the multiplying of the effects exists based on the table 2402. If a material image that does not allow the multiplying of the effects does not exist (NO in step S2511), the processing proceeds to step S2503 described above.

If a material image that does not allow the multiplying of the effects exists (YES in step S2511), the processing proceeds to step S2512. In step S2512, the CPU 101 selects a combination of the effect information pieces which can be applied together to the material image that does not allow the multiplying of the effects. In step S2513, with respect to material images other than the material image that does not allow the multiplying of the effects, the CPU 101 selects the effect information obtained in step S2501, and the processing proceeds to step S2504 described above.

As described above, according to the present exemplary embodiment, an effect that matches a feature quantity of a selected material image can be selected and applied to the material image. Further, the image generation apparatus can be controlled such that effects which cannot produce normal effects or produce opposite effects when used together are not combined. Thus, effects can be appropriately provided to a selected material image.

Aspects of the present disclosure can also be realized by a computer of a system or apparatus (or devices such as a CPU, a micro processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium).

While the present disclosure has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-047947 filed Mar. 5, 2012, which is hereby incorporated by reference herein in its entirety.

What is claimed is:

1. An image generation apparatus comprising:
a storage unit configured to store a plurality of selection condition sets including a plurality of selection conditions used for selecting an image from a plurality of images;
a first image selection unit configured to select at least one image from the plurality of images as a first image;
a feature quantity obtaining unit configured to obtain a feature quantity of the first image;
a selection condition set selection unit configured to select a selection condition set including a selection condition corresponding to the obtained feature quantity from the plurality of selection condition sets stored in the storage unit;
a second image selection unit configured to select a second image from the plurality of images based on the selection condition of the selection condition set which is selected; and
an output image generation unit configured to generate an output image based on the first and the second images which are selected and the selection condition set which is selected.

2. The image generation apparatus according to claim 1, wherein the selection condition set includes a table which consists of a range of the plurality of selection conditions, and
wherein the selection condition set selection unit selects the selection condition set including a selection condition corresponding to the selected feature quantity as the selection condition at a predetermined position in the table.

3. The image generation apparatus according to claim 1, wherein the selection condition set selection unit selects the selection condition set including all the images that satisfy each selection condition of the selection condition set existing in the plurality of the images.

4. The image generation apparatus according to claim 1, wherein the selection condition set selection unit selects the selection condition set designated by a user if a plurality of the selection condition sets including a selection condition corresponding to the selected feature quantity exists.

5. The image generation apparatus according to claim 1, wherein if a plurality of the selection condition sets which are selectable exists, based on a priority determined in advance for the selection condition set, the selection condition set selection unit selects the selection condition set of a higher priority.

6. The image generation apparatus according to claim 5, wherein the selection condition set selection unit sets the priority based on selection history, theme information, and a temporal arrangement position of the image of the selection condition set.

7. The image generation apparatus according to claim 1, wherein the second image selection unit selects an image stored in an external apparatus as a second image via a network.

8. The image generation apparatus according to claim 1, wherein the second image selection unit edits the image such that the image matches the selection condition, and selects the edited image as the second image.

9. The image generation apparatus according to claim 1, wherein the first image selection unit selects an image selected by a user as the first image.

10. The image generation apparatus according to claim 1, wherein the first image selection unit selects an image including a feature quantity designated by a user as the first image.

11. The image generation apparatus according to claim 1, wherein the output image generation unit generates an output image such that the first image is arranged in an order designated by a user.

12. The image generation apparatus according to claim 1, wherein the output image generation unit generates an output image such that the first image is arranged in a shooting date and time order.

13. The image generation apparatus according to claim 1, further comprising a display unit,
wherein the display unit includes a user-selected image display area configured to display the image selected by the first image selection unit and an image sequence selection area configured to display a plurality of image sequences generated by the output image generation unit.

14. A method for controlling an image generation apparatus, the method comprising:
causing a first image selection unit to select at least one image from a plurality of images as a first image;
causing a feature quantity obtaining unit to obtain a feature quantity of the first image;
causing a selection condition set selection unit to select a selection condition set including a selection condition corresponding to the obtained feature quantity from a plurality of selection condition sets stored in a storage unit storing a plurality of selection condition sets including a plurality of selection conditions used for selecting an image from a plurality of images;
causing a second image selection unit to select a second image from the plurality of images based on a selection condition of the selection condition set which is selected; and
causing an output image generation unit to generate an output image based on the first and the second images which are selected and the selection condition set which is selected.

15. A non-transitory computer-readable storage medium storing a computer-executable program according to claim 14.

16. The image generation apparatus according to claim 1, wherein the selection condition set includes information indicating image processing to be added to a selected image and a condition for adding the image processing, and
wherein the selection condition set selection unit selects, in addition to the selection condition, image processing including the obtained feature quantity.

17. The image generation apparatus according to claim 16, wherein the selection condition set includes information indicating whether at least two types of the image processing can be applied together,
wherein if a plurality types of image processing to be applied exists, the selection condition set selection unit determines whether the image processing can be applied together based on the information indicating whether the image processing can be applied together, and
wherein if the image processing cannot be applied together, a combination of image processing which can be applied together is selected.

18. A non-transitory computer-readable storage medium storing a computer-executable program for controlling an image generation apparatus, the program comprising a code for:
causing a first image selection unit to select at least one image from a plurality of images as a first image;
causing a feature quantity obtaining unit to obtain a feature quantity of the first image;
causing a selection condition set selection unit to select a selection condition set including the obtained feature quantity from a plurality of selection condition sets stored in a storage unit storing a plurality of selection condition sets including a plurality of selection conditions used for selecting an image from a plurality of images;
causing a second image selection unit to select a second image from the plurality of images based on a selection condition of the selection condition set which is selected; and
causing an output image generation unit to generate an output image based on the first and the second images which are selected and the selection condition set which is selected.

* * * * *